(12) United States Patent
Ishihara et al.

(10) Patent No.: US 8,634,493 B2
(45) Date of Patent: Jan. 21, 2014

(54) COMMUNICATION DEVICE AND PROGRAM PRODUCT

(75) Inventors: Takeshi Ishihara, Kanagawa (JP);
Tsuyoshi Kogawa, Kanagawa (JP); Eiji Kamagata, Kanagawa (JP); Takafumi Sakamoto, Tokyo (JP); Koji Ogura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 299 days.

(21) Appl. No.: 13/235,393

(22) Filed: Sep. 18, 2011

(65) Prior Publication Data
US 2012/0219092 A1    Aug. 30, 2012

(30) Foreign Application Priority Data
Feb. 28, 2011   (JP) ................. 2011-043166

(51) Int. Cl.
*H04L 27/00* (2006.01)
(52) U.S. Cl.
USPC ......................................... 375/295
(58) Field of Classification Search
USPC ................... 375/219, 220, 259, 295
See application file for complete search history.

(56) References Cited

U.S. PATENT DOCUMENTS

| | | | | |
|---|---|---|---|---|
| 6,643,341 | B1 * | 11/2003 | Fukuda ..................... | 375/358 |
| 2002/0018002 | A1 * | 2/2002 | Stippler ................. | 340/825.69 |
| 2002/0105698 | A1 * | 8/2002 | Thomas .................... | 359/142 |
| 2007/0147440 | A1 * | 6/2007 | Song et al. ................ | 370/537 |
| 2009/0103593 | A1 * | 4/2009 | Bergamo ................. | 375/146 |

FOREIGN PATENT DOCUMENTS

| | | |
|---|---|---|
| JP | 2008-153807 | 7/2008 |
| JP | 2009-225141 | 10/2009 |
| JP | 2010-199850 | 9/2010 |

* cited by examiner

*Primary Examiner* — Don N Vo
(74) *Attorney, Agent, or Firm* — Oblon, Spivak, McClelland, Maier & Neustadt, L.L.P.

(57) ABSTRACT

According to one embodiment, a communication device, which performs communication using a first communication method and a second communication method, converts information to be transmitted into information for forming a pulse that is formed depending on the presence and absence of transmission of a radio wave, according to the first communication method. The communication device decides a suppression time, during which communication with a communication device other than a communication partner is suppressed, on the basis of a result of the conversion. The communication device generates an output signal including the transmission suppression signal, in which the suppression time is set for each first element in the pulse, according to the second communication method, the first element transmitting a radio wave. The communication device transmits a radio wave according to the output signal to the communication partner at timing to transmit a radio wave in the pulse.

9 Claims, 17 Drawing Sheets

CASE OF BINARY PPM

100 ⇒ H/t, L/t, H/t, L/2t, H/t

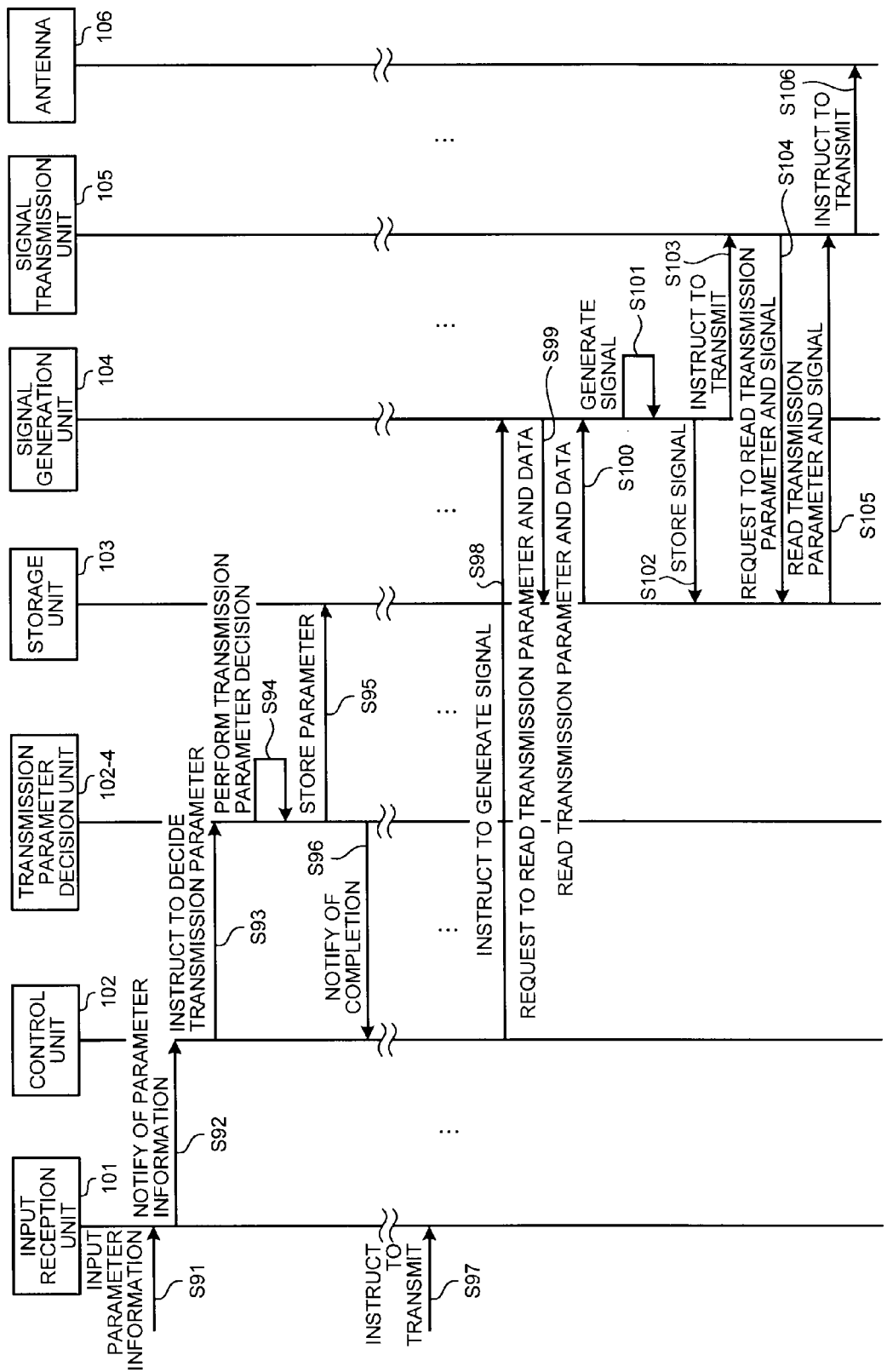

FIG.21

| RADIO WAVE TRANSMISSION TIME | TRANSMISSION RATE | TRANSMISSION BIT NUMBER | COMMUNICATION METHOD |
|---|---|---|---|
| $t_{0on}$ | $S_0$(bps) | $L_0$(BIT) | IEEE802.11b(short) |
| $t_{1on}$ | $S_1$(bps) | $L_1$(BIT) | IEEE802.11b(short) |
| $t_{0on} + t_{1on}$ | $S_2$(bps) | $L_2$(BIT) | IEEE802.11b(long) |

FIG.22

| RADIO WAVE TRANSMISSION TIME | TRANSMISSION RATE 1 | TRANSMISSION BIT NUMBER 1 | COMMUNICATION METHOD 1 | SWITCHING POINT |
| | TRANSMISSION RATE 2 | TRANSMISSION BIT NUMBER 2 | COMMUNICATION METHOD 2 | |
|---|---|---|---|---|
| $t_{0on}$ | $S_{01}$(bps) | $L_{01}$(BIT) | IEEE802.11b | $T_0(\mu s)$ |
| | $S_{02}$(bps) | $L_{02}$(BIT) | IEEE802.11b | |
| $t_{1on}$ | $S_{11}$(bps) | $L_{11}$(BIT) | IEEE802.11b | — |
| | — | — | — | |
| $t_{0on} + t_{1on}$ | $S_{21}$(bps) | $L_{21}$(BIT) | IEEE802.11b | $T_2(\mu s)$ |
| | $S_{22}$(bps) | $L_{22}$(BIT) | IEEE802.11g | |

1701, 1702, 1703

0

1

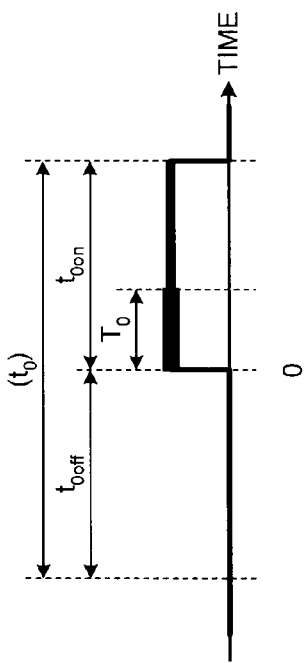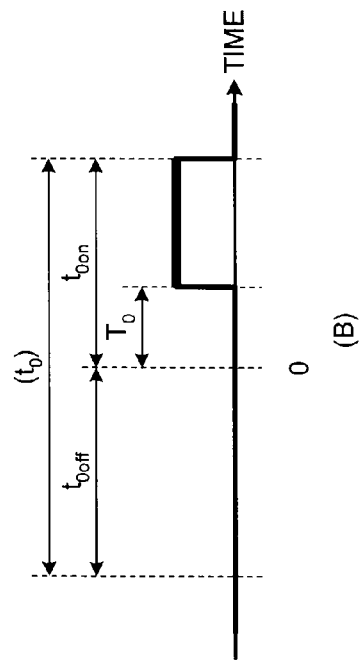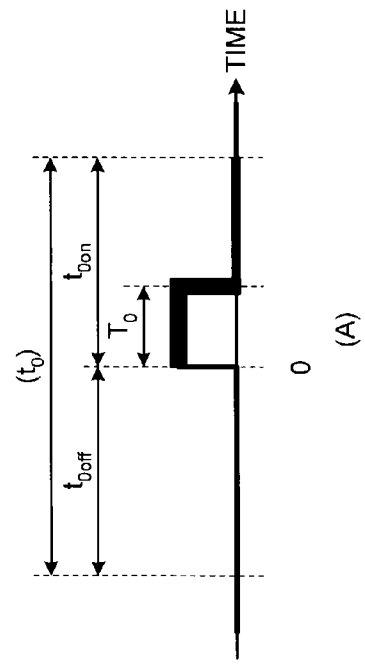
FIG.28

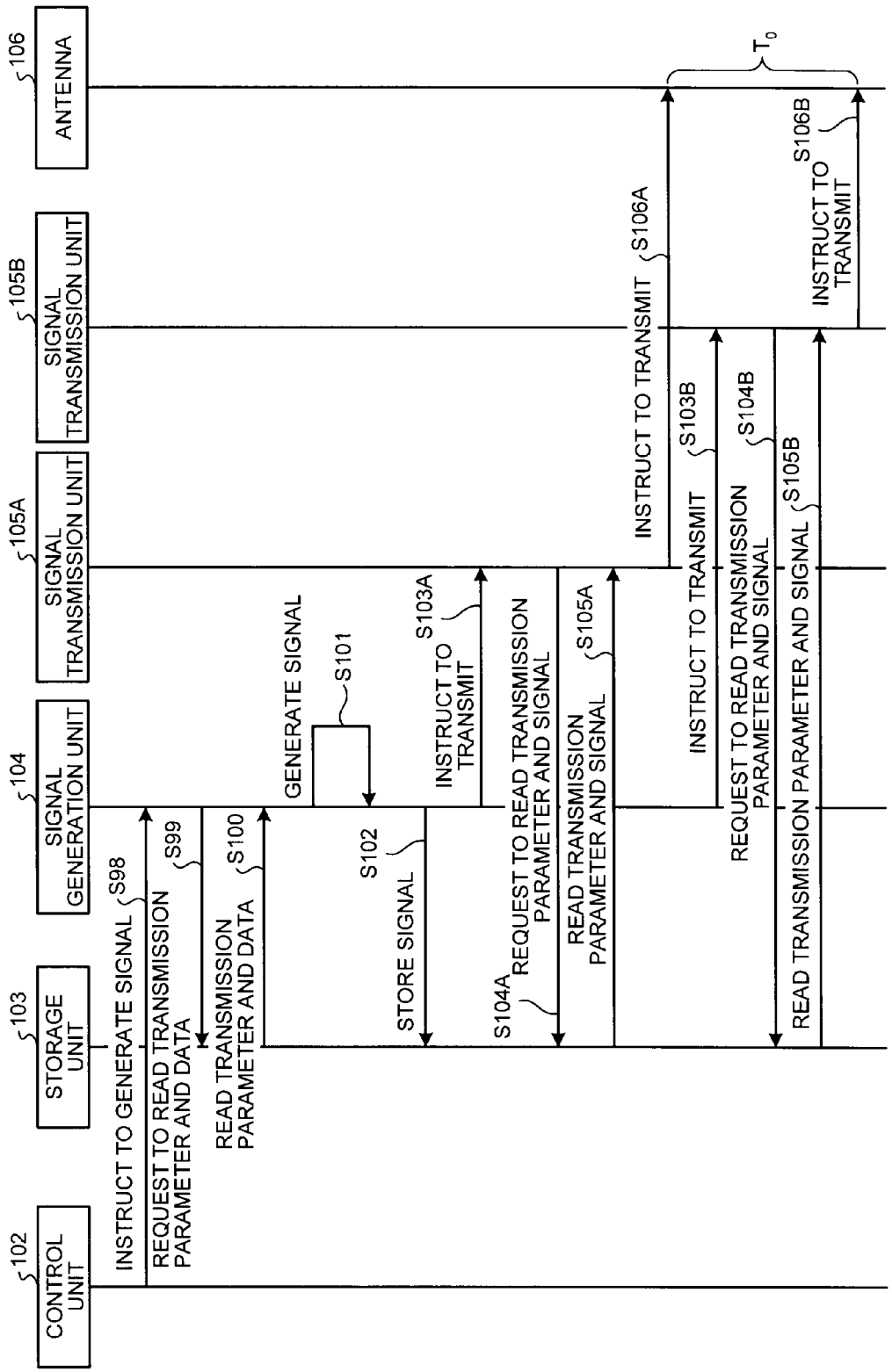

COMMUNICATION DEVICE AND PROGRAM PRODUCT

CROSS-REFERENCE TO RELATED APPLICATION

This application is based upon and claims the benefit of priority from Japanese Patent Application No. 2011-043166, filed on Feb. 28, 2011; the entire contents of which are incorporated herein by reference.

FIELD

Embodiments described herein relate generally to a communication device and a program product.

BACKGROUND

Conventionally, techniques for remotely activating a communication device in a standby state through a network have been widely known. For example, a wake-on local area network (LAN) method of transmitting a magic packet (a registered trademark) on a network of an IEEE 802.3 standard and a wake-on wireless LAN method of transmitting a magic packet on a network of an IEEE 802.11 standard are known. These techniques can be easily introduced because remote activation can be implemented using existing network infrastructure. However, there has been a problem in that a considerable amount of power is consumed in awaiting reception of a magic packet.

There is a technique of awaiting an activation signal at low power consumption by detecting a regular change in a radio wave. There is also a technique of using an existing communication infrastructure by representing the presence and absence of a regular radio wave with a frame of the IEEE 802.11 standard. Further, there is a technique of setting a network allocation vector (NAV) (a transmission suppression time), which corresponds to a period of time until an activation signal ends, to a frame of the IEEE 802.11 standard for creating the activation signal. This technique prevents, while a communication device is transmitting the activation signal, another communication device other than a communication partner from transmitting a radio wave. Thus, the activation signal is more accurately transmitted. Further, there is a technique of calculating a time until an activation signal ends and individually setting a value of the NAV each time when a frame of the IEEE 802.11 standard for creating the activation signal is transmitted. Furthermore, there is a wireless communication technique of changing a transmission rate of information to be transmitted on a carrier wave and transmitting new information in addition to the information. An example of the new information is a state transition signal.

BRIEF DESCRIPTION OF THE DRAWINGS

FIG. 20 is a flowchart illustrating a procedure of a communication process;

FIG. 21 is a diagram illustrating a transmission parameter;

FIG. 22 is a diagram illustrating the transmission parameter;

FIG. 28 is a diagram illustrating a transmission instruction of an output signal and a radio wave according to the output signal; and FIG. 29 is a flowchart illustrating a procedure of a communication process according to a modified embodiment.

DETAILED DESCRIPTION

In general, according to one embodiment, a communication device, which performs communication using a first communication method and a second communication method, converts information to be transmitted into information for forming a pulse that is formed depending on the presence and absence of transmission of a radio wave, according to the first communication method. The communication device decides a suppression time, during which communication with a communication device other than a communication partner is suppressed, on the basis of a result of the conversion. The communication device generates an output signal including the transmission suppression signal, in which the suppression time is set for each first element in the pulse, according to the second communication method, the first element transmitting a radio wave. The communication device transmits a radio wave according to the output signal to the communication partner at timing to transmit a radio wave in the pulse.

First Embodiment

Figure 1:
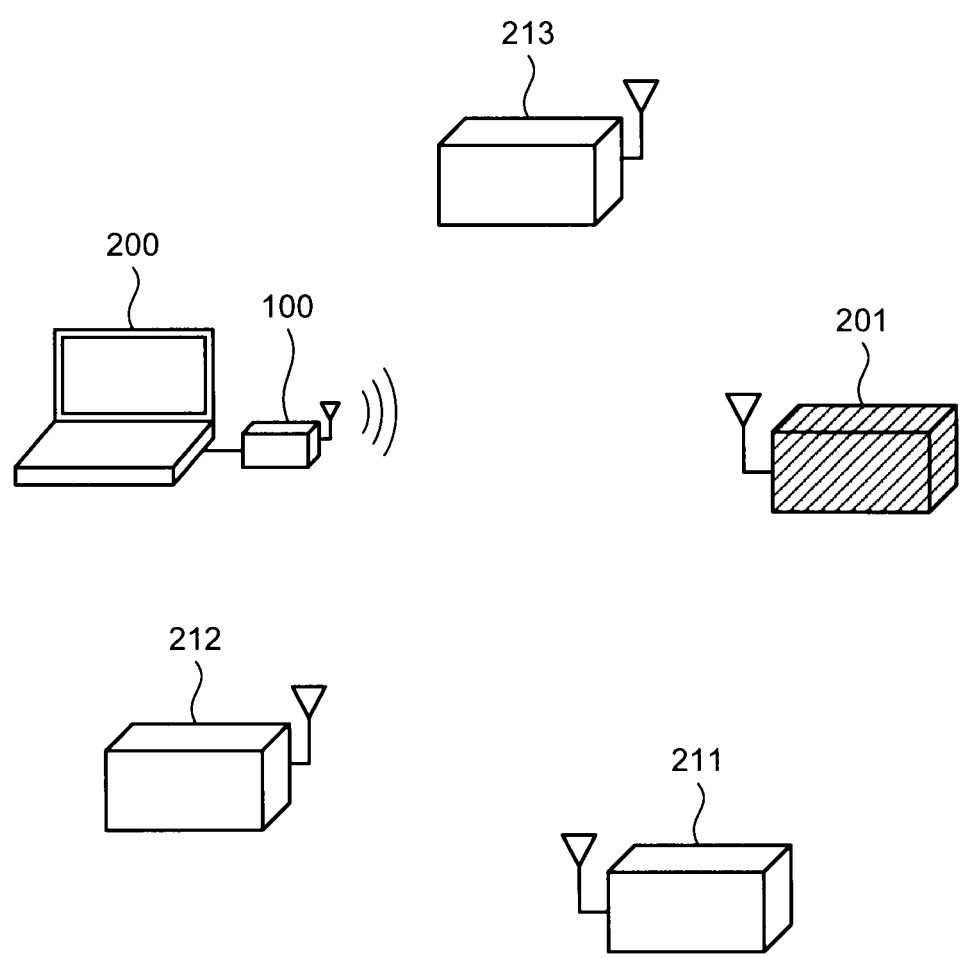
FIG. 1 is a diagram illustrating a configuration of a communication system that includes a communication device according to a first embodiment.

First, a configuration of a communication system that includes a communication device 100 according to the present embodiment will be described with reference to FIG. 1. The communication device 100 performs communication with a communication partner using a first communication method for transmitting a pulse-like radio wave and a second communication method for suppressing communication with a communication device other than the communication partner by transmitting a transmission suppression signal. The communication device 100 is connected to a personal computer (PC) 200, and the PC 200 can perform wireless communication with each of communication devices 201 and 211 to 213 through the communication device 100 using certain channels (frequency bands). The communication devices 201 and 211 to 213 can perform wireless communication using corresponding channels. An identifier for identifying a corresponding communication device is assigned to each of the communication devices 201 and 211 to 213. In FIG. 1, each of the communication devices 201 and 211 to 213 is represented as an end node, but an intermediate node such as an access point of a wireless LAN may be included as the PC 200 or the communication devices 201 and 211 to 213. The PC 200 and the communication device 100 may be integrally formed. All or some of functions of the communication device 100 and a part of transmitting control information may be included in the communication devices 201 and 211 to 213. Here, a description will be made in connection with the PC 200. However, the present embodiment is not limited thereto, and there may be used another device that performs communication with the communication devices 201 and 211 to 213 through the communication device 100. The control information refers to a control instruction on a communication partner, for example, an activation instruction on a communication partner.

Next, a description will be made in connection with a hardware configuration of the communication device 100 according to the present embodiment. The communication device 100 has a control unit such as a central processing unit (CPU) that controls an overall device, a storage unit such as a read only memory (ROM) or a random access memory (RAM) that stores a variety of data or a variety of programs, a communication interface (I/F) that controls wireless communication between the PC 200 and the communication devices 201 and 211 to 213, and a bus connecting the above components with one another. The communication I/F includes an antenna for performing wireless communication.

Figure 2:
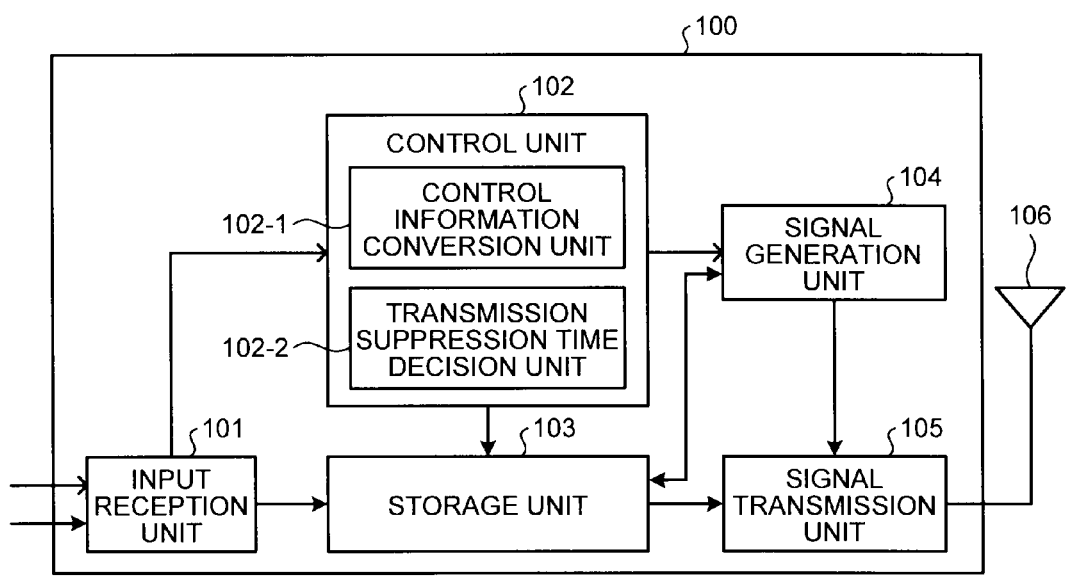
FIG. 2 is a diagram illustrating a functional configuration of the communication device.

Next, various functions implemented by the communication device 100 having the above hardware configuration will be described with reference to FIG. 2. The communication device 100 includes an input reception unit 101, a control unit 102, a storage unit 103, a signal generation unit 104, and a signal transmission unit 105. Functions of the input reception unit 101 and the control unit 102 are implemented by executing various programs stored in the storage unit through the CPU of the communication device 100. Functions of the signal generation unit 104 and the signal transmission unit 105 are implemented by executing various programs stored in the storage unit through the communication I/F of the communication device 100 and the CPU of the communication device 100. The storage unit 103 refers to a storage area secured in the storage unit of the communication device 100.

The input reception unit 101 is connected to the PC 200 and receives input of control information transmitted from the PC 200 or a transmission instruction of data. The control unit 102 controls the overall communication device 100 and includes a control information conversion unit 102-1 and a transmission suppression time decision unit 102-2. The control information conversion unit 102-1 converts the received control information into information, which is needed by the signal generation unit 104 for generating a signal according to the first communication method. That is, the control information conversion unit 102-1 converts the control information into information for forming a pulse that is formed depending on the presence and absence of transmission of a radio wave. The pulse includes an element for transmitting the radio wave and an element for not transmitting the radio wave. The transmission suppression time decision unit 102-2 decides, on the basis of a conversion result of the control information by the control information conversion unit 102-1, a time (referred to as "transmission suppression time") for suppressing communication with a communication device other than the communication partner that performs communication according to the second communication method. For example, when the communication partner that performs communication with the PC 200 through the communication device 100 is the communication device 201, the communication devices 211 to 213 are communication devices other than the communication partner. The storage unit 103 stores the input control information and data or various pieces of information used for control by the control unit 102. The signal generation unit 104 generates, according to the second communication method, an output signal including the transmission suppression signal to which the transmission suppression time decided by the transmission suppression time decision unit 102-2 is set using the conversion result of the control information by the control information conversion unit 102-1. The signal transmission unit 105 transmits the radio wave according to the output signal generated by the signal generation unit 104 to the communication partner through an antenna 106 at timing for transmitting the radio wave in the pulse converted by the control information conversion unit 102-1 according to the first communication method.

Since a unique configuration of the present embodiment is associated with a part for transmitting a signal, a configuration for receiving a signal is neither illustrated in the drawings nor described, but the communication device 100 may have a configuration for receiving a signal.

Figure 3:
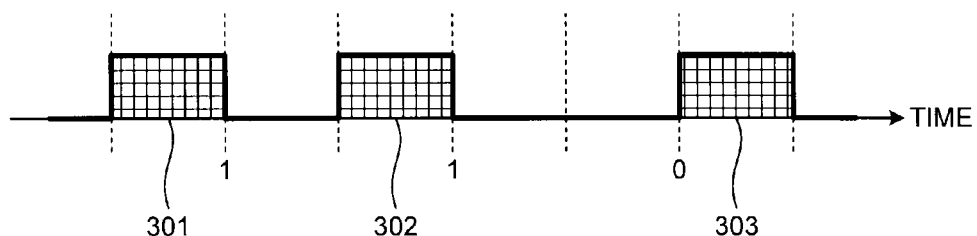
FIG. 3 is a diagram illustrating an output signal transmitted by the communication device.

An example of the output signal transmitted by the communication device 100 will be described with reference to FIG. 3. The output signal refers to a signal output under the assumption that a value "110" is input to the communication device 100 as the control information, and certain data is input. A thick line part of FIG. 3 is one in which maximum radio field intensities at respective times are connected. The output signal includes the control information to be transmitted according to the first communication method. That is, in FIG. 3, the value "110" is expressed as the control information using a pulse formed by the presence and absence of transmission of the radio wave. Shaded portions 301 to 303 are elements for transmitting the radio wave and are frames according to the second communication method. The frame includes the transmission suppression signal to which the transmission suppression time is set. The frame may include data on which the transmission instruction is transmitted from the PC 200. When the transmission instruction is not transmitted from the PC 200, the frame only includes the transmission suppression signal.

As described above, the communication device 100 can transmit different information to the communication partner using two different communication methods. In FIG. 3, a binary amplitude-shift keying (ASK) is used as the first communication method, but a different modulation method may be used.

Next, a procedure of a communication process performed by the communication device 100 according to the present embodiment will be described with reference to FIG. 4. In step S1, the input reception unit 101 of the communication device 100 receives an input of a transmission instruction of a signal (referred to as "input signal") including control information representing a control instruction on a corresponding communication partner from the PC 200. The input signal may include data. When data is included in the input signal, in step S2, the input reception unit 101 stores the data in the storage unit 103. Then, in step S3, the input reception unit 101 notifies the control unit 102 of the transmission instruction of the input signal. This notification includes an identifier of a communication device which is the communication partner and the control information. When data is not included in the input signal, step S2 is skipped.

At this time, the input reception unit 101 determines whether the received input signal includes information to be transmitted according to the first communication method or the received input signal only includes information to be transmitted according to the second communication method that is an ordinary method. There are first and second determining methods. The first method is a method of transmitting the type of the input signal by an instruction means which is different from the instruction system of the two communication methods. For example, in a level of an operating system (OS), a predetermined identifier is designated using a system call such as "ioctl( )", and a device driver notifies the input reception unit 101 of the information through a predetermined register, a descriptor, a control command, or the like. The second method is a method of performing notification using a value having a special meaning for an identifier of a communication partner to which the output signal is transmitted according to the second communication method. For example, in an MAC address, 0x02 (a global bit) of a leading octet is set to "0", and an address used only between the PC 200 that gives an instruction and the communication device 100 is stored in the other bits. The input signal transmitted using the address as a destination address according to the second communication method is determined to include information to be transmitted according to the first communication method. Here, the input reception unit 101 determines that the control information to be transmitted according to the second communication method is included in the input signal.

When the notification is received from the input reception unit 101, in step S4, the control unit 102 instructs the control information conversion unit 102-1 to convert the control information included in the notification into an internal expression for generating the pulse according to the first communication method. In step S5, the control information conversion unit 102-1 performs a conversion process for converting the control information into the pulse that is formed depending on the presence and absence of transmission of the radio wave. Here, a description will be made in connection the details of the conversion process. The control information input to the control information conversion unit 102-1 is expressed by a sequence of values of "0" or "1" (referred to as "control command sequence"), and the control information conversion unit 102-1 converts the control command sequence into the pulse according to the modulation scheme used in the first communication method through the conversion process. Thus, the details of the conversion process vary depending on the modulation scheme used, but an essential portion thereof is the same. In the following description, the binary ASK is exemplarily described as the modulation scheme.

In the binary ASK, a value is represented by the magnitude (high-low) of the amplitude. Duration of the same amplitude is a fixed value which has been set in advance. On the basis of this, the control information conversion unit 102-1 converts the value "0" represented by the control command sequence into the internal expression of a low level and converts "1" into the internal expression of a high level. The internal expression of the low level represents that the radio wave is not transmitted, and the internal expression of the high level represents that the radio wave is transmitted. The reason why the internal expression is used is because the radio wave is not actually regarded as a processing target at this stage. The presence or absence of transmission of the radio wave is actually controlled at a later stage on the basis of the internal expression. The control information conversion unit 102-1 decides a time (duration) during which the low level lasts or a duration during which the high level lasts on each internal expression. That is, the control information conversion unit 102-1 decides duration during which transmission of the radio wave is suspended or a duration during which transmission of the radio wave is continued on each internal expression.

The control information conversion unit 102-1 performs the conversion process as described above and returns the internal expression converted for each value represented by the control command sequence and the duration on each internal expression to the control unit 102 as the conversion result in step S6. When the duration is fixed, it is not necessary to return the corresponding internal expression and the duration to the control unit. When the duration is different as in pulse width modulation (PWM) or pulse interval modulation (PIM), the value needs to be returned to the control unit 102 as the conversion result.

Figure 5:
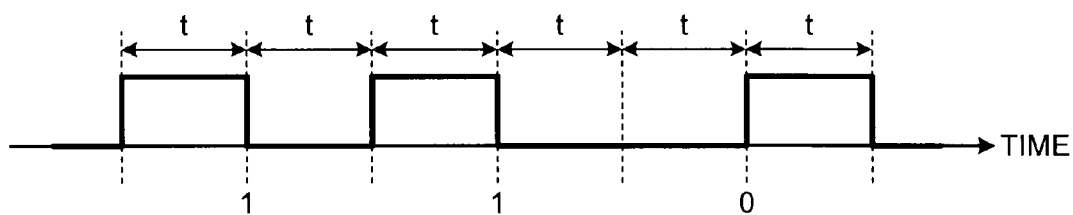
FIG. 5 is a diagram illustrating a conversion result of a control information conversion unit.

For example, when the control command sequence input to the control information conversion unit 102-1 is "110", as illustrated in FIG. 5, the conversion result includes four elements; "H/t, L/t, H/t, L/2t, and H/t". "H" represents the internal expression of the high level, "L" represents the internal expression of the low level, and "t" represents the duration. "H/t" represents that the high level lasts during the duration t. Similarly, "L/t" represents that the low level lasts during the duration t. FIG. 5 is illustrated to help understanding of the disclosure, and this type of expression may not be used.

Further, the control information conversion unit 102-1 may not perform the conversion each time when the input reception unit 101 receives the input of the input signal. For example, a pattern adapted to an envisioned pattern of the input signal may be calculated in advance and stored in the storage unit 103, and the control information conversion unit 102-1 may read out the pattern of the input signal in the conversion process.

Subsequently, returning to the description of FIG. 4, in step S7, the control information conversion unit 102-1 instructs the transmission suppression time decision unit 102-2 to decide the transmission suppression time on the basis of the conversion result. In step S8, the transmission suppression time decision unit 102-2 performs a suppression time decision process for deciding the transmission suppression time. Here, a description will be made in connection with the details of the suppression time decision process. In the suppression time decision process, the transmission suppression time decision unit 102-2 specifies an element for not transmitting the radio wave on the basis of the internal expression in the conversion result and obtains the duration, during which suspension of transmission of the radio wave is continued, on the basis of the duration included in the internal expression. The obtained duration is the longest duration of an element for not transmitting the radio wave. That is, the transmission suppression time decision unit 102-2 decides the longest duration among the durations of the elements for not transmitting the radio wave as the transmission suppression time. The transmission suppression time decision unit 102-2 may not perform the decision each time when the decision process is instructed. For example, a suppression time adapted to an envisioned conversion result may be calculated in advance and stored in the storage unit 103, and the transmission suppression time decision unit 102-2 may read out the suppression time matching with the conversion result in the decision process. Further, the transmission suppression time decision unit 102-2 may calculate the suppression times corresponding to all of the envisioned conversion results in advance and decides the longest time among the calculated suppression times as the suppression time on an arbitrary conversion result.

For example, when the control command sequence input to the control information conversion unit 102-1 is "110" as described above, and the conversion result is "H/t, L/t, H/t, L/2t, H/t" as illustrated in FIG. 5, an element for not transmitting the radio wave is a part specified by "L" such as "L/t" and "L/2t". The durations of the elements are "t" and "2t", respectively, and the longest duration is "2t".

Figure 4:
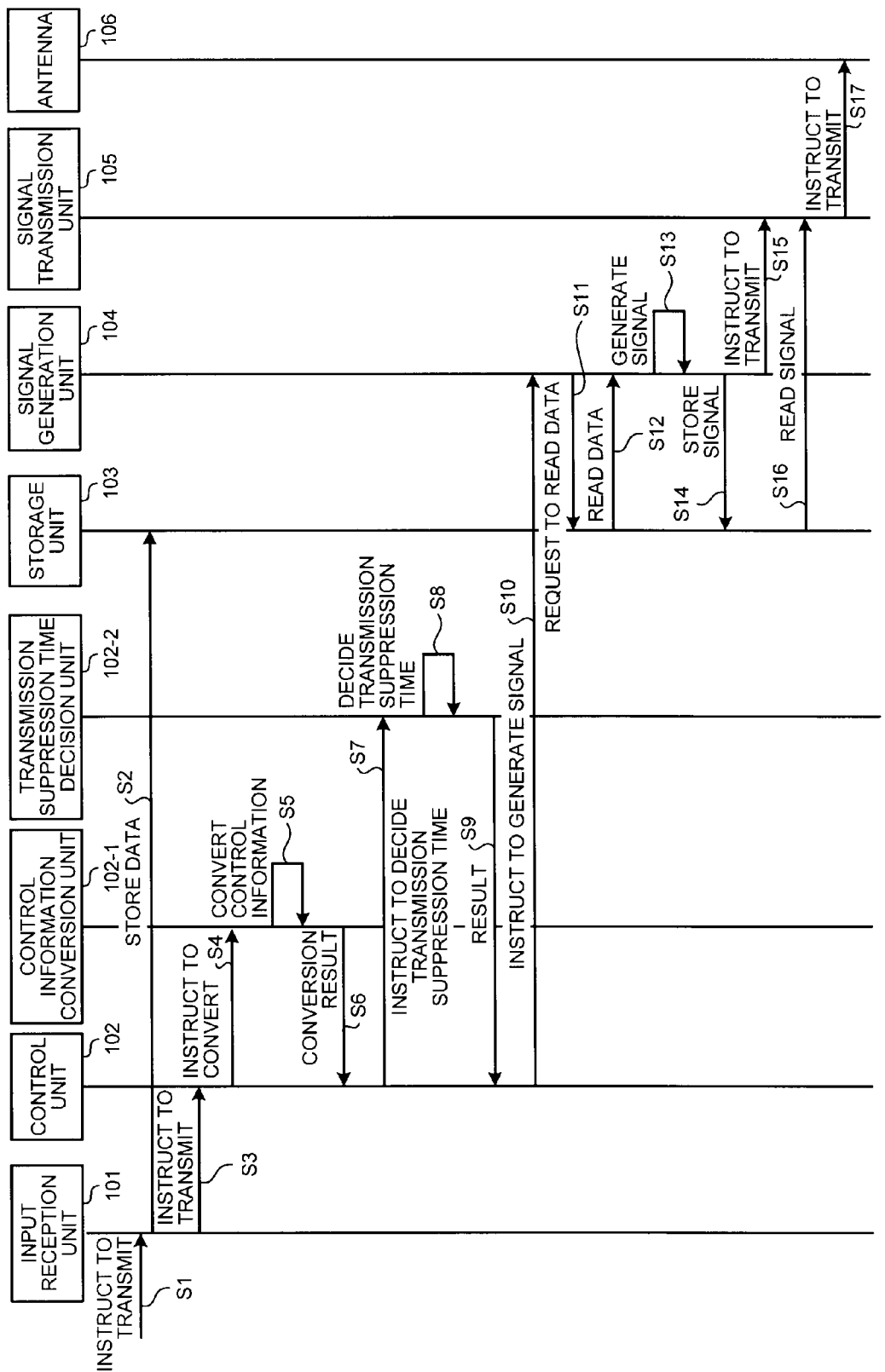
FIG. 4 is a flowchart illustrating a procedure of a communication process performed by the communication device.

Returning to the description of FIG. 4, in step S9, the transmission suppression time decision unit 102-2 returns the decided transmission suppression time to the control unit 102. Thereafter, in step S10, the control unit 102 notifies the signal generation unit 104 of the presence or absence of data, a storage address when data is present, the conversion result of the control information, and the transmission suppression time and instructs the signal generation unit 104 to generate the output signal. In the above-described example, the conversion result of the control information "H/t, L/t, H/t, L/2t, H/t" and the transmission suppression time "2t" are notified to the signal generation unit 104. When data is not present, the storage address is not notified.

When it is notified that data is present, in steps S11 and S12, the signal generation unit 104 reads out data from the notified storage address in the storage unit 103. Thereafter, in step S13, the signal generation unit 104 performs a signal generation process for generating the output signal according to the second communication method using the notified conversion result of conversion of the control information and the transmission suppression time and further using data read from the storage unit 103 when it is notified that data is present. Here, the details of the signal generation process will be described with reference to FIG. 6. When generation of the output signal is instructed, in step S31, the signal generation unit 104 first judges whether or not the storage address has been notified. When it is judged that the storage address has been notified (Yes in step S31), in step S32, the signal generation unit 104 reads out data stored in the storage address in the storage unit 103. Subsequently, in step S33, the signal generation unit 104 focuses on a first element of the conversion result of the control information. When the conversion result of the control information is "H/t, L/t, H/t, L/2t, H/t", "H/t" is the first element.

First, in step S34, the signal generation unit 104 judges whether or not it is necessary to transmit the radio wave in the focused element. For example, when the internal expression in the focused element is "H", the signal generation unit 104 judges that it is necessary to transmit the radio wave, whereas when the internal expression in the focused element is "L", the signal generation unit 104 judges that it is not necessary to transmit the radio wave. When it is judged that it is not necessary to transmit the radio wave (No in step S34), in step S40, the signal generation unit 104 generates standby information representing an instruction for causing transmission of the radio wave to be on standby during the duration corresponding to the internal expression. That is, the signal generation unit 104 generate standby information representing the duration during which suspension of transmission of the radio wave is continued (referred to as "radio wave suspension time) as a standby time. When it is judged that it is necessary to transmit the radio wave (Yes in step S34), in step S35, the signal generation unit 104 compares the duration corresponding to the internal expression in the focused element, that is, a duration during which transmission of the radio wave is continued (referred to as "radio wave transmission time") with a time necessary for transmitting data read out in step S32 (referred to as "data transmission time") when it is judged in step S31 that data is present. The radio wave transmission time is "t" in the first element. The data transmission time may be calculated and stored in the storage unit 103 in advance together with data when the control unit 102 stores the data in the storage unit 103. Alternatively, the signal generation unit 104 may calculate the data transmission time on the basis of the data amount of corresponding data. In either case, a time needed to transmit data according to the second communication method is used as the data transmission time.

When the data transmission time is shorter than the radio wave transmission time corresponding to the internal expression in the focused element (Yes in step S35), the signal generation unit 104 generates a frame having the signal length corresponding to the data amount of corresponding data using the data read out in step S32. At this time, in step S36, the signal generation unit 104 generates padding data for complementing a time by which the data transmission time is shorter than the radio wave transmission time. In step S37, the signal generation unit 104 combines the data read out in step S32 with the padding data as one frame, and then the process proceeds to step S39. In contrast, when the storage address is not notified and it is judged that data to be transmitted is not present (No in step S31) or when the data transmission time is longer than the radio wave transmission time corresponding to the internal expression in the focused element (No in step S35), in step S38, the signal generation unit 104 generates dummy data of the length appropriate for a transmission time as a frame, and then the process proceeds to step S39. The dummy data conforms to the second communication method and has an appropriate format (for example, includes a MAC layer header or the like).

In step S39, the signal generation unit 104 sets the transmission suppression time notified from the control unit 102 to the frame generated in step S36 or step S37. In this way, processing on one focused element in the conversion result of the control information is completed through processing from steps S34 to S40. Subsequently, in step S41, the signal generation unit 104 focuses on an element in the conversion result of the control information on which corresponding processing is not completed. When it is judged that the element is present (Yes in step S42), the process returns to step S34 by regarding the corresponding element as the focused element. When it is judged that there is no element on which processing is not completed (No in step S42), it is judged that processing on all elements in the conversion result of the control information has been completed, and in step S43, the signal generation unit 104 stores the frame and the standby information generated on each element in the storage unit 103. Then, in step S44, the signal generation unit 104 notifies the signal transmission unit 105 of the storage address representing a storage location of the storage unit 103 in which the frame and the standby information (which are hereinafter referred to as "output signal") has been stored and instructs the signal transmission unit 105 to transmit the output signal. Described above are the details of the signal generation process.

Incidentally, the standby information generated in step S40 may not be required depending on an implementation form. For example, when the frame has been generated for an element in the conversion result of the control information and transmission timing can be set to each frame, the signal generation unit 104 may set appropriate transmission timing. The timing can be set in the element that requires transmission of the radio wave in view of the length of a portion, which does not require transmission of the radio wave, the element being next to an element that does not require transmission of the radio wave.

Figure 7:
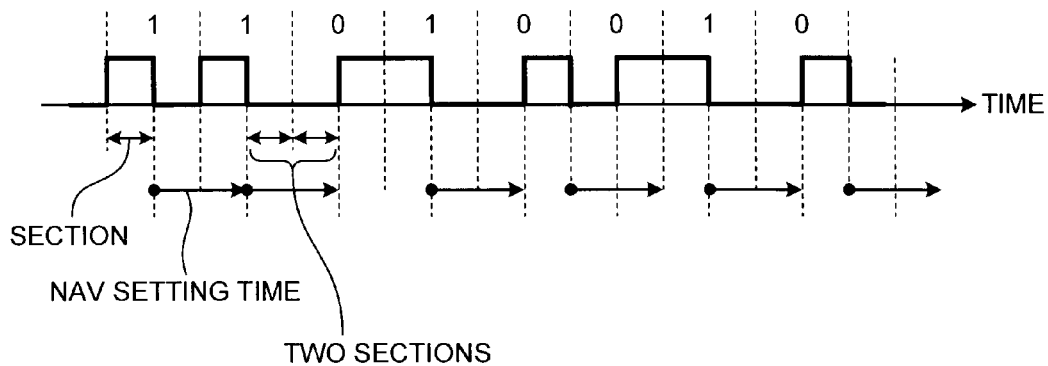
FIG. 7 is a diagram illustrating an example of a case of transmitting an eight-bit output signal using an ASK according to a first communication method.

Here, a description will be made in connection with an example of the set transmission suppression time. First, a description will be made in connection with a case of using the ASK as the modulation scheme of the first communication method. FIG. 7 is a diagram illustrating an example of a case of transmitting an eight-bit signal using the ASK according to the first communication method. Each portion in which the radio wave is transmitted is configured with a frame according to the second communication method. In FIG. 7, the longest radio wave suspension time during which suspension of transmission of the radio wave is continued is a time corresponding to two elements in which the radio wave is not transmitted. Thus, the transmission suppression time is set to each frame according to the second communication method such that the transmission can be suppressed during the radio wave suspension time corresponding to the two elements. According to the above-described procedure, as illustrated in FIG. 7, the transmission suppression time is set to the frame which is to be finally transmitted according to the second communication method. After the final frame is transmitted, there is no need to suppress transmission. When the transmission suppression time has been set to the final frame, communication with the communication device other than the communication partner that performs communication according to the second communication method may be unnecessarily suppressed. Thus, the signal generation unit 104 may not set the transmission suppression time to the frame which is to be finally transmitted according to the second communication method.

Figure 8:
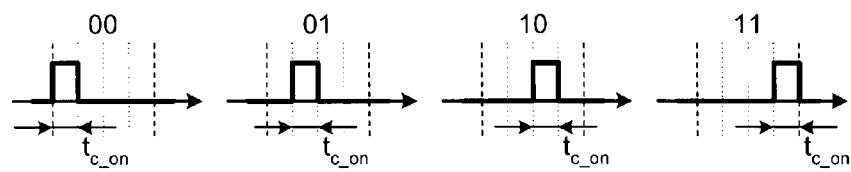
FIG. 8 is a diagram illustrating an example of a case of transmitting an output signal according to the first communication method.
Figure 9:
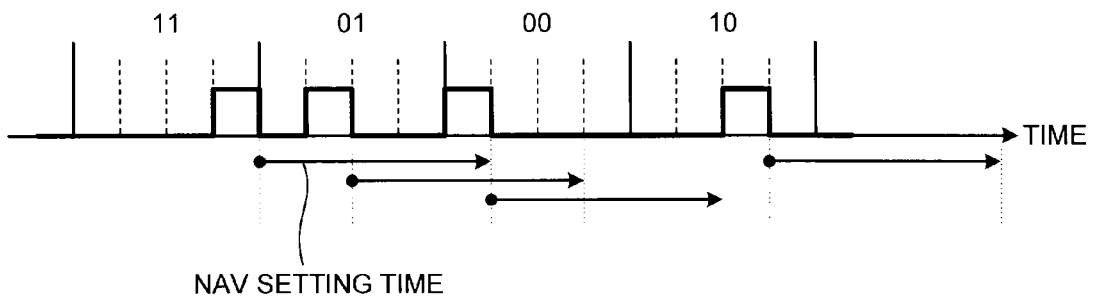
FIG. 9 is a diagram illustrating an example of a case of transmitting an output signal according to the first communication method.
Figure 10:
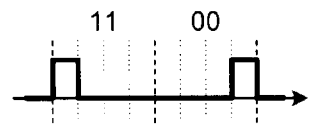
FIG. 10 is a diagram illustrating an example of a case of transmitting an output signal according to the first communication method.

Next, a description will be made in connection with a case of using four-valued pulse position modulation (PPM) as a modulation scheme in the first communication method. FIGS. 8 to 10 are diagrams illustrating an example of a case of transmitting a signal using the four-valued PPM according to the first communication method. A case is considered in which the position of a pulse has been set as illustrated in FIG. 8. When the eight-bit signal used in FIG. 7 is transmitted, the transmission suppression time is set as illustrated in FIG. 9.

As illustrated in FIG. 9, $5 \times t_{c\_on}$ is set. In order to simplify processing by the transmission suppression time decision unit 102-2, by returning the longest case among all combinations of codes, $6 \times t_{c\_on}$ may be set.

As can be seen from the examples of FIGS. 8 to 10, a fixed transmission suppression time may be set on the basis of a property of a code used in the first communication method. In the case of such an implementation form, the transmission suppression time decision unit 102-2 returns the fixed value according to the modulation scheme used in the first communication method. This value can be derived by $T = Tc \times (n-1) \times 2$, where Tc is the chip length by the n-valued PPM, and T is the transmission suppression time.

Figure 11:
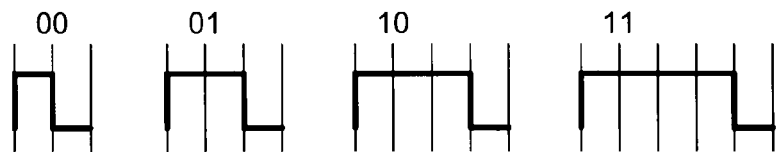
FIG. 11 is a diagram illustrating an example of a case of transmitting an output signal according to the first communication method.
Figure 12:
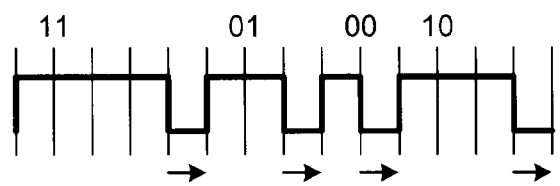
FIG. 12 is a diagram illustrating an example of a case of transmitting an output signal according to the first communication method.
Figure 13:
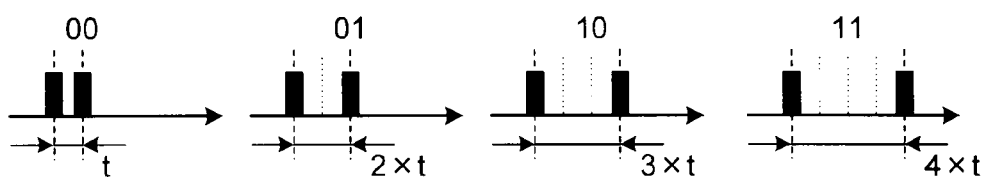
FIG. 13 is a diagram illustrating an example of a case of transmitting an output signal according to the first communication method.

Next, a description will be made in connection with a case of using four-valued pulse width modulation (PWM) as the modulation scheme in the first communication method. FIGS. 11 to 13 are diagrams illustrating an example of a case of transmitting a signal using the four-valued PWM according to the first communication method. When the width of a pulse is to set as illustrated in FIG. 11 and the eight-bit signal used in FIG. 7 is transmitted, the transmission suppression time is set as illustrated in FIG. 12.

Figure 14:
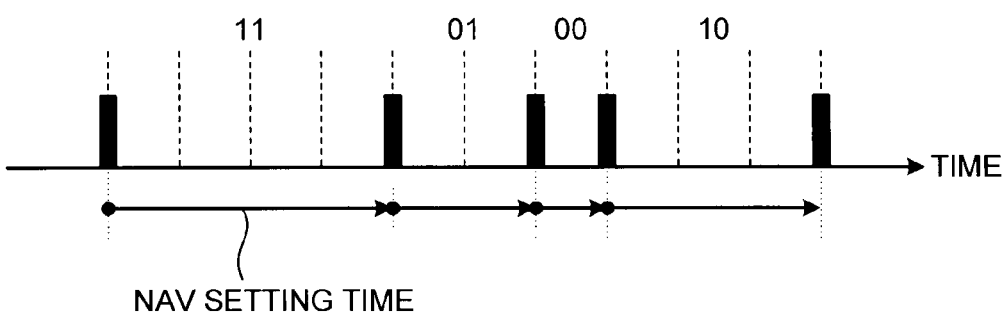
FIG. 14 is a diagram illustrating an example of a case of transmitting an output signal according to the first communication method.
Figure 15:
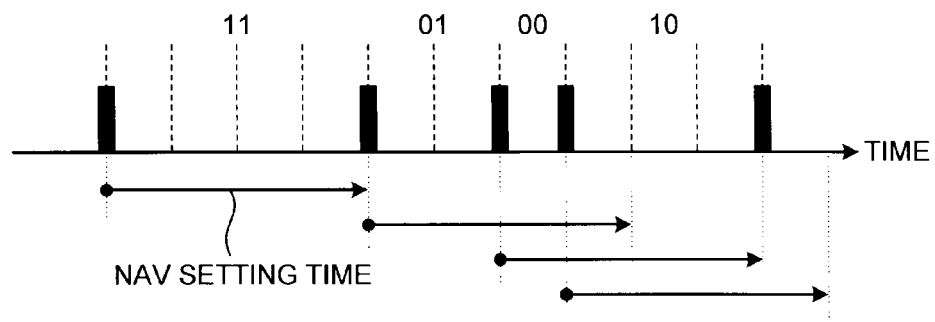
FIG. 15 is a diagram illustrating an example of a case of transmitting an output signal according to the first communication method.

Next, a description will be made in connection with a case of using four-valued pulse interval modulation (PIM) as the modulation scheme in the first communication method. FIGS. 14 and 15 are diagrams illustrating an example of a case of transmitting a signal using the four-valued PIM according to the first communication method. When an interval of a pulse is to set as illustrated in FIG. 14 and the eight-bit signal used in FIG. 7 is transmitted, the transmission suppression time is set as illustrated in FIG. 14. Further, the transmission suppression time may be set according to an individual element (see FIG. 15). When the PIM is used, the transmission suppression time may not be set to the pulse which is to be finally transmitted.

Figure 6:
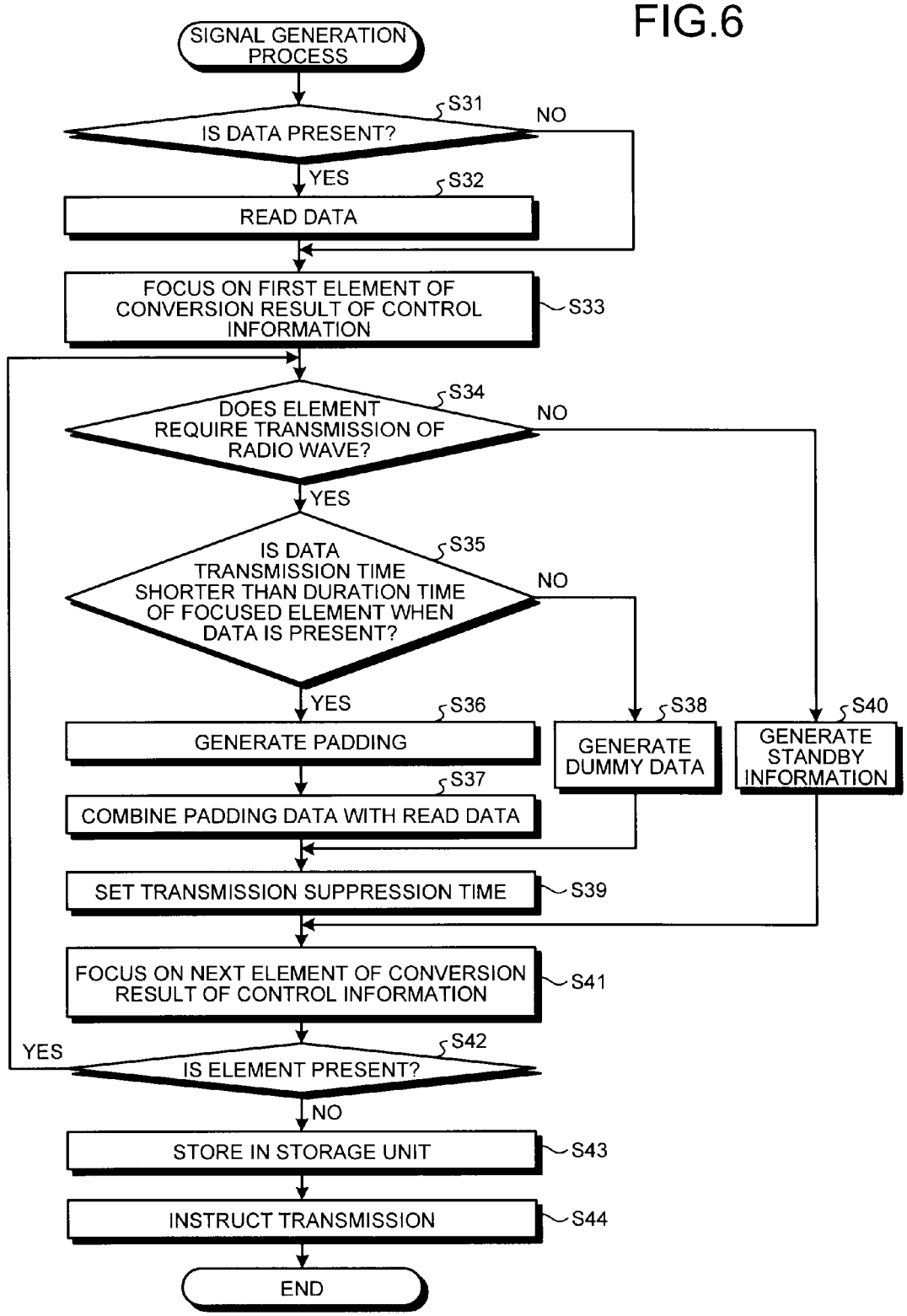
FIG. 6 is a flowchart illustrating a detailed procedure of a signal generation process.

Returning to the description of FIG. 4, step S14 corresponds to step S43 of FIG. 6, and step S15 corresponds to step S44 of FIG. 6. When the notification of the storage address of the output signal and the transmission instruction of the output signal are received, in step S16, the signal transmission unit 105 sequentially reads out the output signals from the storage unit 103. In step S17, the signal transmission unit 105 executes processing for transmitting the output signal as the radio wave and then transmits the radio wave according to the output signal to the communication partner through the antenna 106 at timing for transmitting the radio wave in the pulse converted in step S5 according to the first communication method. As a result, at timing for transmitting the radio wave in the pulse according to the first communication method, transmitted is the radio wave corresponding to each frame including the transmission suppression signal, which is generated in step S36 or step S37 of FIG. 6 and to which the transmission suppression time is set in step S39. Described above is the procedure of the communication process performed by the communication device 100.

In the above-described example, the signal generation unit 104 generates all of the output signals using all of the elements of the conversion result of the control information and stores the output signals in the storage unit 103, and thereafter instructs the signal transmission unit 105 to transmit the output signals. However, when the frame is generated by processing one element of the conversion result of the control information, the signal transmission unit 105 may be immediately instructed to transmit the corresponding frame. At this time, the frame of the transmission target may be transmitted from the signal generation unit 104 directly to the signal transmission unit 105 without the intervention of the storage unit 103.

As described above, on the basis of the time, during which suspension of transmission of the radio wave in an element for not transmitting the radio wave according to the first communication method for transmitting the pulse-like radio wave is continued, the transmission suppression time for suppressing communication with the communication device other than the communication partner that performs communication according to the second communication method is set, the output signal according to the second communication method is generated, and the output signal is transmitted to the communication partner. Thus, it is possible to more reliably transmit the radio wave that is transmitted according to the first communication method without expending a large capacity of memory and making the configuration complicated. In the communication device that performs communication using the second communication method of suppressing communication with the communication device other than the communication partner, by setting a time, during which suspension of transmission of the radio wave is continued and which is the longest time among elements for not transmitting the radio wave, as transmission suspension time, it is possible to more reliably suppress communication with the communication device other than the communication partner that performs communication according to the second communication method.

By applying the configuration to, for example, the communication system in which remote activation using the wireless LAN infrastructure is implemented at ultra low power consumption, the transmission suppression time can be set such that the activation signal as the output signal is not obstructed by a wireless LAN device other than the communication partner, and thus stable remote activation can be implemented. Further, the frame length required in the activation signal can be generated by the wireless LAN signal.

Second Embodiment

Next, a description will be made in connection with a communication device and a program according to a second embodiment. Parts which are in common with the first embodiment will be described using the same reference numerals, and a redundant description thereof will not be repeated.

Figure 16:
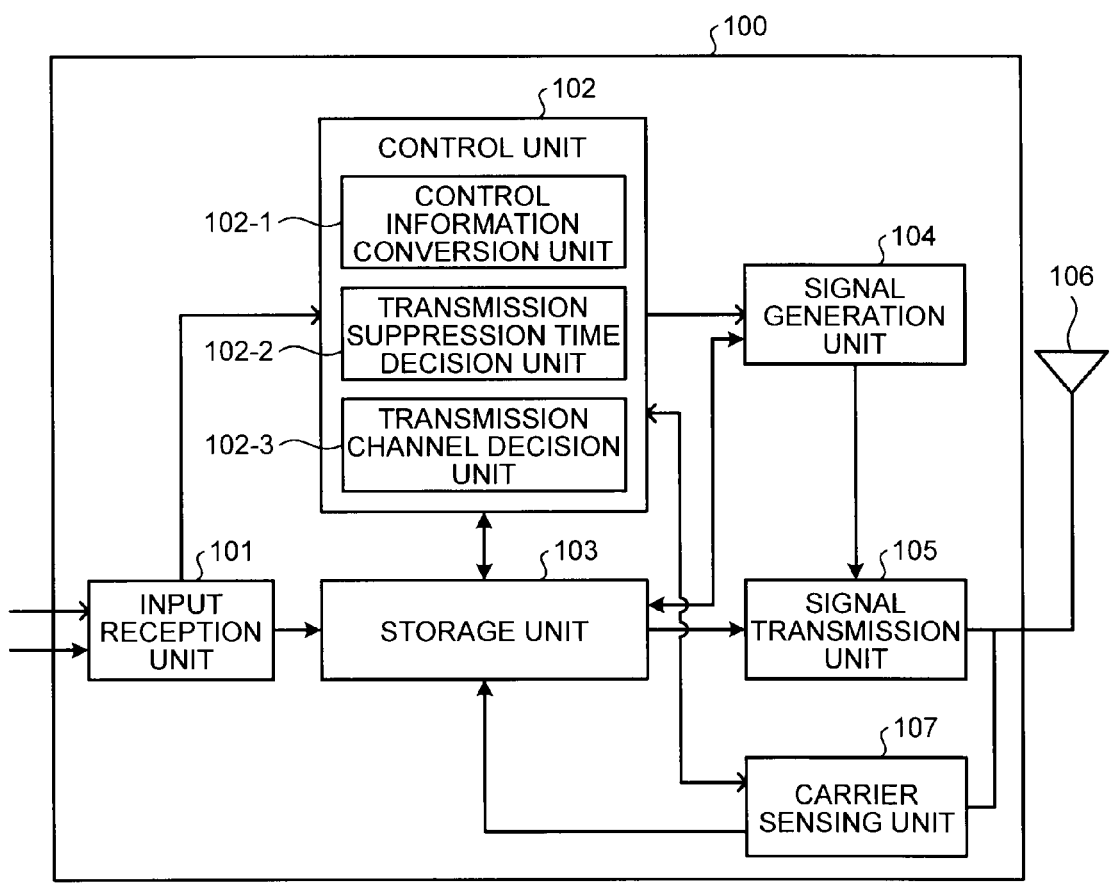
FIG. 16 is a diagram illustrating a functional configuration of a communication device according to a second embodiment.

In the present embodiment, a communication device 100 selectively decides a channel (a frequency band) for transmitting the output signal by performing carrier sensing. FIG. 16 is a diagram illustrating a function configuration of the communication device 100 according to the present embodiment. The communication device 100 further includes a carrier sensing unit 107 in addition to the input reception unit 101, the control unit 102, the storage unit 103, the signal generation unit 104, and the signal transmission unit 105. The control unit 102 further includes a transmission channel decision unit 102-3 in addition to the control information conversion unit 102-1 and the transmission suppression time decision unit 102-2.

The carrier sensing unit 107 performs carrier sensing on the bases of a radio wave received by the antenna 106. The communication device 100 may not include the carrier sensing unit 107 but may include a reception unit for receiving a signal and perform the carrier sensing through the reception unit. A channel that is to be subjected to the carrier sensing is designated by the control unit 102. The transmission channel decision unit 102-3 decides a channel for transmitting the output signal on the basis of a result of the carrier sensing performed by the carrier sensing unit 107. The signal transmission unit 105 transmits the radio wave according to the output signal generated by the signal generation unit 104 to the communication partner through the antenna 106 using the channel decided by the transmission channel decision unit 102-3 at timing for transmitting the radio wave in the pulse converted by the control information conversion unit 102-1 according to the first communication method.

Figure 17:
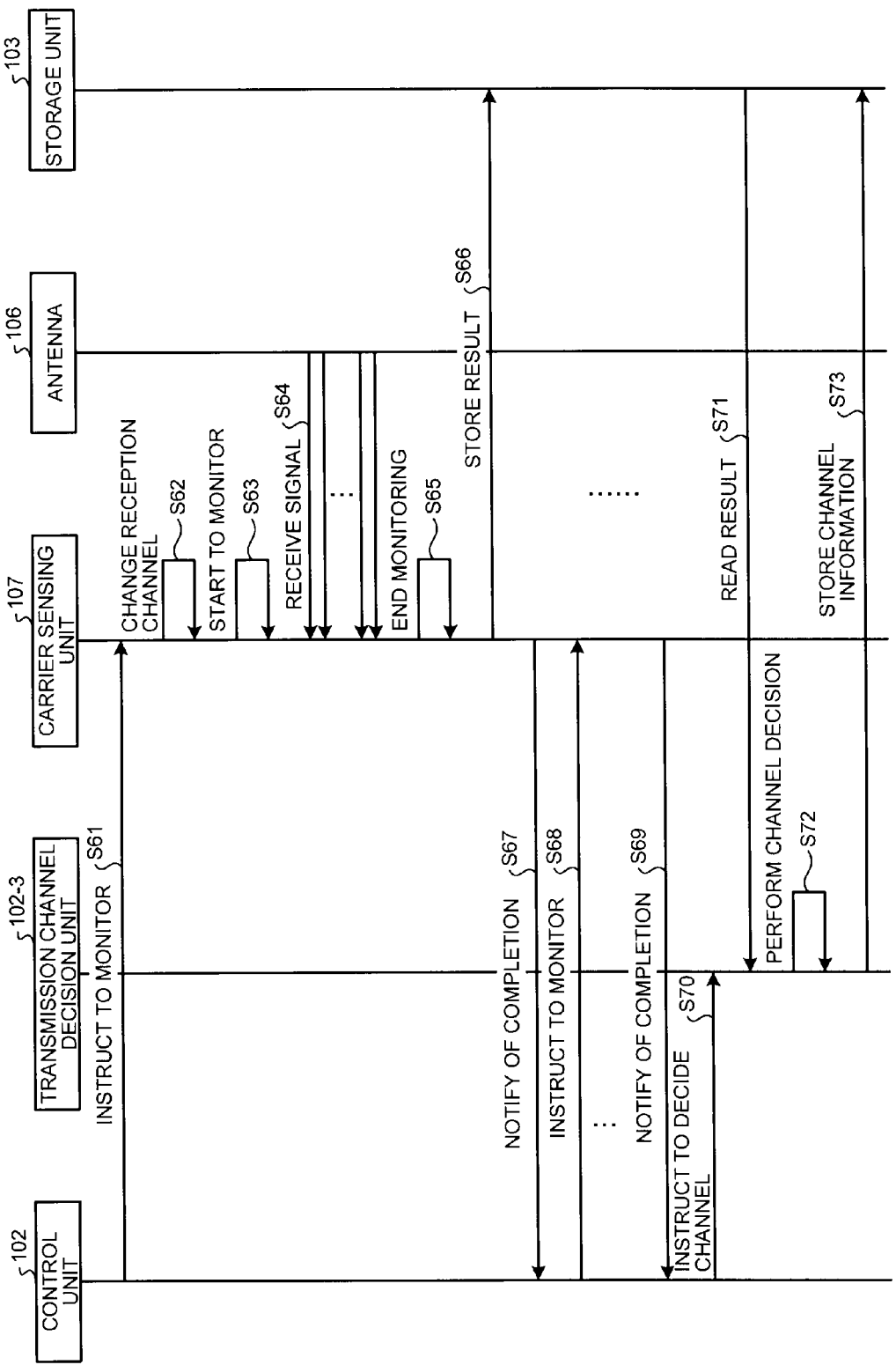
FIG. 17 is a flowchart illustrating a procedure of a channel decision process.

Next, a channel decision process of deciding the channel for transmitting the output signal on the basis of the carrier sensing result according to the present embodiment will be described with reference to FIG. 17. While an input signal is not received through the function of the input reception unit 101 or while the output signal is not transmitted through the function of the signal transmission unit 105, the communication device 100 monitors the presence and absence of a radio wave in a normal state through the function of the carrier sensing unit 107. In step S61, the control unit 102 instructs the carrier sensing unit 107 to monitor one of channels, through which the signal transmission unit 105 can transmit the radio wave, for a certain period of time. Upon receipt of the instruction, the carrier sensing unit 107 changes its channel for receiving the radio wave in step S62 and then starts monitoring in step S63. When the antenna 106 receives the radio wave during monitoring in step S64, the carrier sensing unit 107 analyzes the radio wave and records the fact that the radio wave is being received from the communication device, for example, in a storage unit. Particularly, the carrier sensing unit 107 counts a time at which the radio wave is received (or the amount of data) or the like so as to check a congestion state of each channel. The carrier sensing unit 107 performs the carrier sensing, and then, in step S65, the carrier sensing unit 107 finishes monitoring when a certain period of time has elapsed. In step S66, the carrier sensing result is stored in the storage unit 103, and in step S67, the completion of the carrier sensing is notified to the control unit 102.

When the completion of the carrier sensing is notified, in step S68, the control unit 102 gives an instruction for monitoring another channel, which can be used by the signal transmission unit 105, for a certain period of time so as to perform monitoring of another channel. Thereafter, in step S69, the carrier sensing unit 107 performs the same processing as in steps S62 to S66 and notifies the control unit 102 of the carrier sensing result in the same manner as in step S67. The communication device 100 performs this processing on all channels which can be used by the signal transmission unit 105.

When the completion of the carrier sensing on all channels which can be used by the signal transmission unit 105 is notified, in step S70, the control unit 102 instructs the transmission channel decision unit 102-3 to decide the channel for transmitting the output signal on the basis of the carrier sensing result. In step S71, the transmission channel decision unit 102-3 reads out the carrier sensing result stored in the storage unit 103. In step S72, the transmission channel decision unit 102-3 decides the channel for transmitting the output signal. In step S73, the transmission channel decision unit 102-3 stores information representing the decided channel in the storage unit 103. Here, when the control unit 102 instructs the signal generation unit 104 to generate the output signal in step S10 of FIG. 4, the channel represented by the channel information stored in the storage unit 103 is notified. In step S17 of FIG. 4, the signal transmission unit 105 transmits the radio wave according to the output signal to the communication partner through the antenna 106 using the channel decided in step S72 at timing for transmitting the radio wave in the pulse converted in step S5 according to the first communication method.

Here, a description will be made in connection with a method of deciding the channel for transmitting the output signal by the transmission channel decision unit 102-3. Two methods can be exemplified: a method of selecting the most congested channel; and a method of selecting the most available channel. In the case of the former method, transmission from the communication device using the most congested channel is suppressed by setting the transmission suppression time. In the case of the latter method, sporadic transmission from the communication device which is originally low in transmission frequency is further suppressed by setting the transmission suppression time.

The transmission channel decision unit 102-3 may fixedly use any one method or may dynamically switch the methods to use. In the case of fixedly using any one method, selection of the method is not particularly limited to the former or the latter. In the case of switching dynamically, it is conceivable that, for example, when availability of the detected channel is larger than a previously set threshold value (when more available), the later method is used, whereas when availability of the detected channel is smaller than the threshold value (when more congested), the former method is used.

As described above, in the present embodiment, the channel for transmitting the output signal is decided on the basis of the result of the carrier sensing. Thus, more stable transmission of the output signal can be implemented.

Third Embodiment

Next, a description will be made in connection with a communication device and a program according to a third embodiment. Parts which are in common with the first embodiment or the second embodiment will be described using the same reference numerals, and a redundant description thereof will not be repeated.

In the first and second embodiments, a transmission rate of the output signal is not explicitly changed. In this case, since it is required to match with the transmission rate of the second communication method, it may be difficult to realize the radio wave transmission time necessary for continuing transmission of the radio wave in the element according to the first communication method. In the present embodiment, the communication device 100 explicitly changes the transmission rate so as to match with the radio wave transmission time required by the first communication method.

Figure 18:
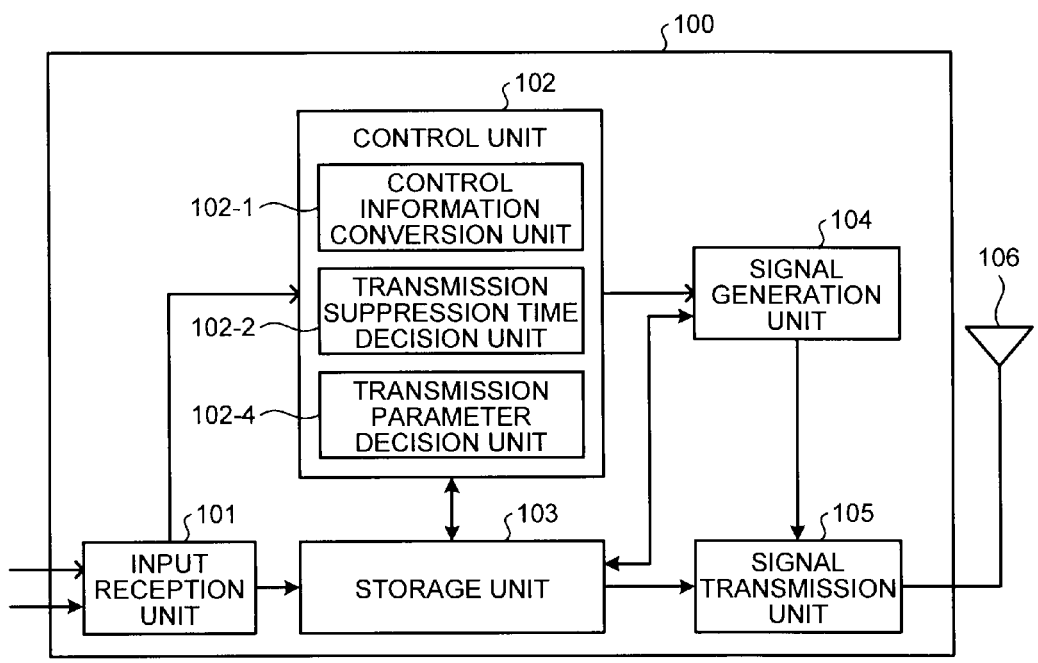
FIG. 18 is a diagram illustrating a functional configuration of a communication device according to a third embodiment.

FIG. 18 is a diagram illustrating a functional configuration of the communication device 100 according to the present embodiment. Components included in the communication device 100 are almost the same as in the first embodiment, but are different from the first embodiment in the following point. The control unit 102 of the communication device 100 further includes a transmission parameter decision unit 102-4 in addition to the control information conversion unit 102-1 and the transmission suppression time decision unit 102-2.

The input reception unit 101 receives an input of the control information or a transmission instruction of data transmitted from the PC 200 and further receives an input of parameter information transmitted from the PC 200. The parameter information represents a combination of the radio wave transmission time, the radio wave suspension time, and timings for the radio wave transmission and the radio wave suspension, in which the radio wave transmission time means the time for which the radio wave is continuously transmitted according to the value "1" represented in the control information, and the radio wave suspension time means the time for which the transmission of the radio wave is continuously suspended according to the value "0" represented in the control information.

Figure 19:
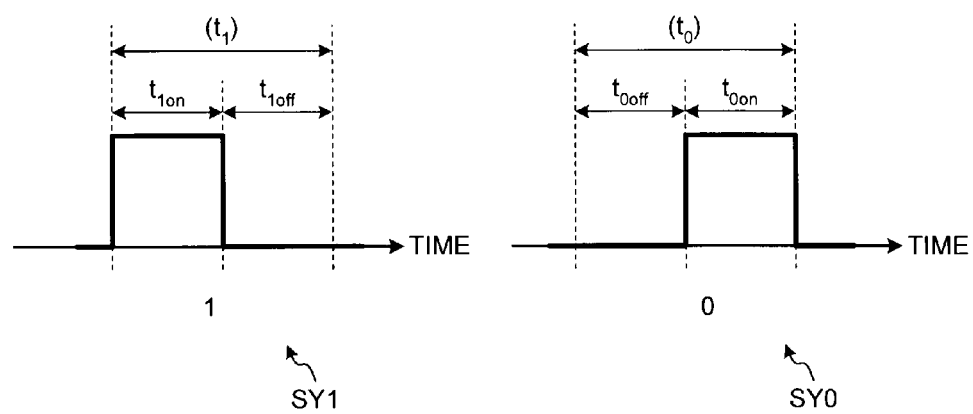
FIG. 19 is a diagram explaining parameter information.

FIG. 19 is a diagram explaining the parameter information when the binary ASK is used as the modulation scheme of the first communication method. In FIG. 19, symbols SY0 and SY1 are specified such that forms of pulses thereof are characterized corresponding to the values "0" and "1" represented in the control information, respectively. That is, the symbols SY0 and SY1 represent a procedure of transmission of the radio wave and suspension of transmission of the radio wave for representing one-bit information, radio wave transmission times $t_{0on}$ and $t_{1on}$, and radio wave suspension times $t_{0off}$ and $t_{1off}$. Here, times $t_0$ and $t_1$ in which the radio wave transmission times are combined with the radio wave suspension times may not be represented by the symbols SY0 and SY1.

The transmission parameter decision unit 102-4 decides a transmission parameter using the parameter information received by the input reception unit 101. The transmission parameter refers to a parameter related to transmission of the radio wave according to the output signal and includes, for example, a transmission rate and a transmission bit number which are necessary for implementing the radio wave forming the pulse converted from the control information in transmission of the radio wave according to the signal in the second communication method.

The signal generation unit 104 generates the output signal on the bases of the conversion result of the control information by the control information conversion unit 102-1, the transmission suppression time decided by the transmission suppression time decision unit 102-2, and the transmission parameter decided by the transmission parameter decision unit 102-4. When the transmission instruction is received, the signal transmission unit 105 reads out the output signal and the transmission parameter from the storage unit 103 and transmits the radio wave according to the output signal generated by the signal generation unit 104 to the communication partner through the antenna 106 according to the transmission parameter decided by the transmission parameter decision unit 102-4 at timing for transmitting the radio wave in the pulse converted by the control information conversion unit 102-1 according to the first communication method.

Next, a procedure of a communication performed by the communication device 100 according to the present embodiment will be described with reference to FIG. 20. In FIG. 20, a redundant description will not be repeatedly given as to parts equivalent to the first embodiment. In step S91, the input reception unit 101 of the communication device 100 receives an input of the parameter information from the PC 200. Then, in step S92, the input reception unit 101 transmits the parameter information to the control unit 102. When the parameter information is received, in step S93, the control unit 102 transmits the parameter information to the transmission parameter decision unit 102-4 and instructs the transmission parameter decision unit 102-4 to decide the transmission parameter. In step S94, the transmission parameter decision unit 102-4 performs a transmission parameter decision process for deciding the transmission parameter using the parameter information. Then, in step S95, the transmission parameter decision unit 102-4 stores the decided transmission parameter in the storage unit 103. Then, in step S96, the transmission parameter decision unit 102-4 notifies the control unit 102 of the completion of the transmission parameter decision process. Here, step S96 may be skipped. Now, a description will be made in connection with the transmission parameter decision process.

The communication device 100 initially performs combined analysis on the possible output signals. Thus, a time during which the radio wave is continuously output can be decided on one symbol and two consecutive symbols generated by the signal generation unit 104. The transmission parameter decision unit 102-4 decides the transmission parameter on the basis of these pieces of information. The transmission rate and the transmission bit number necessary for implementing the radio wave transmission time or the radio wave transmission time are decided as the transmission parameter as described above. In addition, the transmission parameter decision unit 102-4 may decide a communication method and a modulation scheme which are to be used. The transmission parameters are generated using a calculation formula for calculating the frame length in the second communication method. When the IEEE 802.11 wireless LAN standard is used as the second communication method, a calculation formula for calculating the frame length thereof is used. At this time, which of the IEEE 802.11 wireless LAN standard is used depends on implementation of the signal transmission unit 105.

Further, the transmission parameter also includes an optional item that depends on the second communication method. For example, according to the IEEE 802.11 standard, a short preamble, a long preamble, and the like are included. The transmission rate is selected from the transmission rate specified in each standard, and the modulation scheme conforms to the used communication standard and the transmission rate.

Further, the transmission parameter decision unit 102-4 decides, in addition to the transmission parameter corresponding to the radio wave transmission time representing a single symbol, the transmission parameter on a combination of symbols in which transmission of the radio wave needs be continued straddling two consecutive symbols. In the example of FIG. 19, "01" is a target. This is because the transmission rate and the transmission bit number necessary for realizing the radio wave transmission time longer than the single symbol may be different.

A method of calculating the transmission rate and the transmission bit number is as follows. If it is assumed that fx is a function for calculating a frame transmission time T in a standard x of the second communication method, fx is a function of a transmission bit number L (T=fx(L)). The standard x is specified according to the communication method and refers to a set of parameters for finally transmitting a frame. For example, in IEEE 802.11b, it is a set in which "a transmission rate of 5.5 Mbps is used using a short preamble".

An inverse function of the function fx is $fx^{-1}(T)$. The function $fx^{-1}(T)$ is a function for calculating the transmission time L from the transmission bit number L. When the calculation result of the inverse function is not an integer, the communication method is regarded as unusable. For some value of T, an integer number L is obtained in a plurality of communication methods. In this case, an appropriate one is selected. A selection criterion may be, for example, to select the function $fx^{-1}(T)$ which is most rapidly found, to select one which is smallest in energy necessary for transmission, or to select one in which the bit length is a multiple of eight (8). The inverse function $fx^{-1}(T)$ is calculated in advance, which is adapted to the implementation of the signal transmission unit 105, and stored in the storage unit, for example. The transmission bit number, which is the calculation result, is described in units of bits, but it may be described in units of bytes when there is a restriction to hardware to use.

FIG. 21 is a diagram illustrating the transmission parameter. As illustrated in FIG. 21, the transmission parameter represents a combination of the transmission rate, the transmission bit number, and the communication standard according to the radio wave transmission time. Generally, when the standard x of the communication method is decided, the modulation scheme can be decided. Thus, the communication standard and the modulation scheme may not be decided. When another communication method is used and they are difficult to decide automatically, the communication standard and the modulation scheme may be decided as the transmission parameter.

In the present embodiment, since a possible combination of the output signals is investigated in advance, the transmission suppression time can be set for each signal. For example, in FIG. 21, a relation between the symbol and the transmission suppression time is not represented by the transmission parameter, but the transmission suppression time can be added to each list. As in the case where the PIM is used as the modulation scheme, i.e., where the transmission suppression time can be set depending on the symbol, the transmission parameter illustrated in FIG. 21 may be stored in the storage unit in association with the symbol and the transmission suppression time.

Incidentally, unless the parameter information received by the input reception unit 101 changes, the transmission parameter decision unit 102-4 may execute the transmission parameter decision process, preferably once. The communication device 100 may not decide the transmission parameter, and the transmission parameter decided by an external information processing device may be input to the input reception unit 101. In this case, the transmission parameter decision unit 102-4 may check whether or not the transmission parameter received by the input reception unit 101 is a combination which can be transmitted by the signal transmission unit 105 and store the transmission parameter in the storage unit 103 when it is an appropriate transmission parameter.

Returning to the description of FIG. 20, in step S97, the input reception unit 101 receives an input of the transmission instruction of the input signal from the PC 200 similarly to step S1 of FIG. 4. Thereafter, steps S2 to S9 of FIG. 4 are performed, but since the details thereof have been described above, a redundant description thereof will not be repeated.

After step S9, in step S98, the control unit 102 notifies the signal generation unit 104 of the storage address of the transmission parameter together with the presence and absence of data, the storage address of the data when the data is present, the conversion result of the control information, and the transmission suppression time, and instructs the signal generation unit 104 to generate the output signal. In steps S99 and S100, the signal generation unit 104 reads out the transmission parameter from the notified storage address of the transmission parameter in the storage unit 103 and reads out data from the notified storage address of data in the storage unit 103 similarly to steps S11 and S12 of FIG. 4 when it is notified that data is present. Thereafter, in step S101, the signal generation unit 104 performs a signal generation process for generating a signal according to the second communication method on the basis of the transmission rate and the transmission bit number included in the transmission parameter read out from the storage unit 103 using the notified conversion result of the control information and the transmission suppression time and further using data read from the storage unit 103 when it is notified that data is present. Then, in step S102, the signal generation unit 104 stores the generated output signal in the storage unit 103. In step S103, the signal generation unit 104 notifies the signal transmission unit 105 of the storage address of the output signal and the storage address of the transmission parameter and instructs the signal transmission unit 105 to transmit the output signal.

In steps S104 and S105, when the notification of the storage address of the output signal and the storage address of the transmission parameter and the transmission instruction of the output signal are received, the signal transmission unit 105 reads out the transmission parameter from the storage unit 103 and sequentially reads out the output signals from the storage unit 103. In step S106, the signal transmission unit 105 executes processing for transmitting the output signal as the radio wave and then transmits the radio wave according to the output signal to the communication partner through the antenna 106 at timing for transmitting the radio wave in the pulse converted in step S5 in FIG. 4 according to the first communication method so that the radio wave can be transmitted at the transmission rate and the transmission bit number represented in the transmission parameter on each frame in the output signal.

As described above, by generating and transmitting the output signal according to the second communication method on the basis of the transmission parameter which can be variously decided, the communication device 100 can increase a degree of freedom of the radio wave transmission time in the first communication method.

According to the configuration, in changing the transmission rate of information by the radio wave in wireless communication to transmit the state transition signal in addition to the information, the transmission rate can be changed so as to match with the length designated for the state transition signal, or the transmission suppression time can be set only to a part of the state transition signal at which the radio wave is not transmitted.

Fourth Embodiment

Next, a description will be made in connection with a communication device and a program according to a fourth embodiment. Parts which are in common with the first embodiment to the third embodiment will be described using the same reference numerals, and a redundant description thereof will not be repeated.

In the third embodiment, in order to implement the radio wave transmission time necessary for continuing transmission of the radio wave in elements according to the first communication method, the communication device 100 controls the transmission parameter on each frame corresponding to a part for transmitting the radio wave in the output signal according to the second communication method. In the present embodiment, the communication device 100 further increases a degree of freedom of the radio wave transmission time in the first communication method by changing the transmission parameter in the middle of each frame in the output signal according to the second communication method. A functional configuration of the communication device 100 according to the fourth embodiment is almost the same as the functional configuration of the communication device 100 according to the third embodiment, but different from the third embodiment in the following point. The transmission parameter decision unit 102-4 decides the transmission rate and the transmission bit number as the transmission parameter using the parameter information received by the input reception unit 101, but the transmission rate and the transmission bit number are appropriately changed before or after a point in time in the middle of the frame. Even when the transmission rate and the transmission bit number are changed before or after a point in time in the middle of the frame, the transmission suppression time set by the signal generation unit 104 may be one on one frame of the first embodiment.

FIG. 22 is a diagram illustrating the transmission parameter decided by the transmission parameter decision unit 102-4 according to the present embodiment. This corresponds to FIG. 21 used for explanation of the third embodiment and is an example in which the parameter information illustrated in FIG. 21 is similarly input. FIG. 22 illustrates a case in which the transmission rate can be changed only at a time point in the middle of the frame. The number of points in time at which the transmission rate is changed is not an essential part of the present embodiment. Thus, the number of points in time is one in FIG. 21, but the number of points in time is not limited to one. The number of points in time may be decided in terms of a configuration of hardware to implement, a prior calculation time, or the like.

Reference numeral 1701 represents the transmission parameter for configuring the symbol corresponding to a value "0". A sequence of "switching points" which are points in time for changing the transmission parameter represents points at which a transmission rate, a transmission bit number, and a communication method of a system 1 (having "1" following each name) are switched to a transmission rate, a transmission bit number, and a communication method of a system 2 (having "2" following each name) when a predetermined time ($T_0$ μs in the example of 1701) has elapsed after the radio wave has started to be generated. A reference numeral 1702 represents the transmission parameter for configuration the symbol corresponding to a value "1". In this case, a predetermined radio wave transmission time $t_{1on}$ can be realized without changing the transmission rate and the transmission bit number in the middle of the frame. A reference numeral 1703 represents the transmission parameter of configuring the symbol corresponding to consecutive values "01". In the case of straddling the symbol as in this example, the transmission parameter may change at an arbitrary point in time without depending on the boundary of the symbol.

Figure 23:
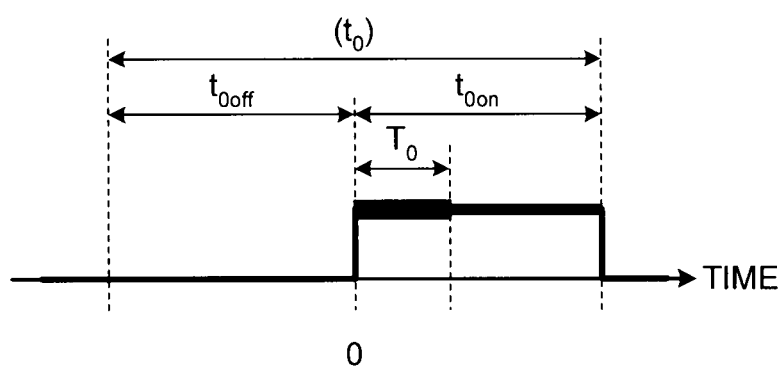
FIG. 23 is a diagram illustrating a form of a radio wave according to an output signal.
Figure 24:
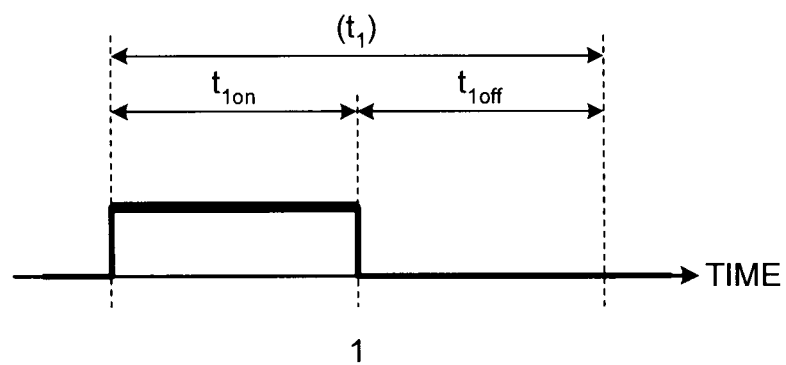
FIG. 24 is a diagram illustrating another form of the radio wave according to an output signal.
Figure 25:
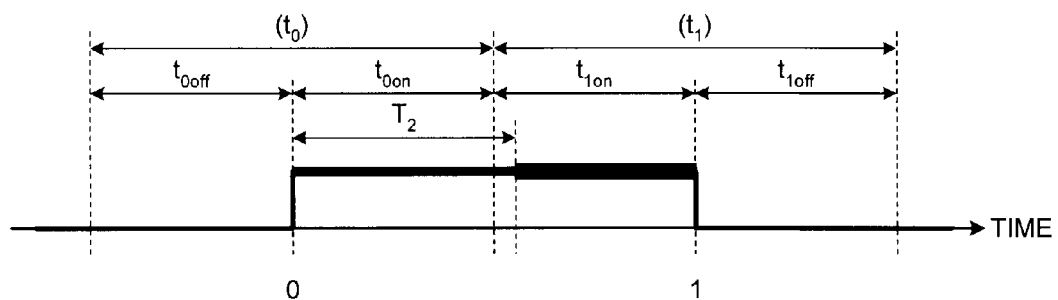
FIG. 25 is a diagram illustrating still another form of the radio wave according to an output signal.

FIGS. 23 to 25 are diagrams illustrating forms of the radio wave according to the output signal transmitted by the signal transmission unit 105 according to the transmission parameter illustrated in FIG. 22. FIG. 23 illustrates the symbol corresponding to a value "0", FIG. 24 illustrates the symbol corresponding to a value "1", and FIG. 25 illustrates the symbol corresponding to consecutive values "01". In FIGS. 23 to 25, a change in the transmission parameter is represented by the line thickness.

FIG. 23 illustrates that transmission bit number $L_{01}$ bits are transmitted at a transmission rate $S_{01}$ during a beginning time $T_0$ in a time $t_{0on}$ during which transmission of the radio wave is continued according to the transmission parameter represented by 1701, and transmission bit number $L_{02}$ bits are transmitted at a transmission rate $S_{02}$ during a second half time "$t_{0on}-T_0$". FIG. 24 illustrates that transmission bit number $L_{11}$ bits are transmitted at a transmission rate $S_{11}$ in the whole section in which transmission of the radio wave is continued according to the transmission parameter represented by 1702. FIG. 25 illustrates that transmission bit number $L_{21}$ bits are transmitted at a transmission rate $S_{21}$ during a beginning time $T_2$ in a time "$t_{0on}+t_{1on}$" during which transmission of the radio wave is continued by the consecutive values "01" according to the transmission parameter represented by 1703, and transmission bit number $L_{22}$ bits are transmitted at a transmission rate $S_{22}$ during a second half time "$(t_{0on}+t_{1on})-T_2$".

In FIG. 22, a correspondence between the symbol and the transmission suppression time is not included, but the transmission suppression time may be added as the transmission parameter illustrated in FIG. 22. The transmission suppression time may be the same value or change before and after the switching point. That is, in a part which is precedingly transmitted, the transmission suppression time may be extended by a time in which another radio wave has been transmitted.

As described above, in the present embodiment, by changing the transmission parameter in the middle of the frame in the output signal transmitted in the second communication method, it is possible to more strictly adapt the radio wave transmission time in the first communication method.

Fifth Embodiment

Next, a description will be made in connection with a communication device and a program according to a fifth embodiment. Parts which are in common with the first embodiment to the fourth embodiment will be described using the same reference numerals, and a redundant description thereof will not be repeated.

Figure 26:
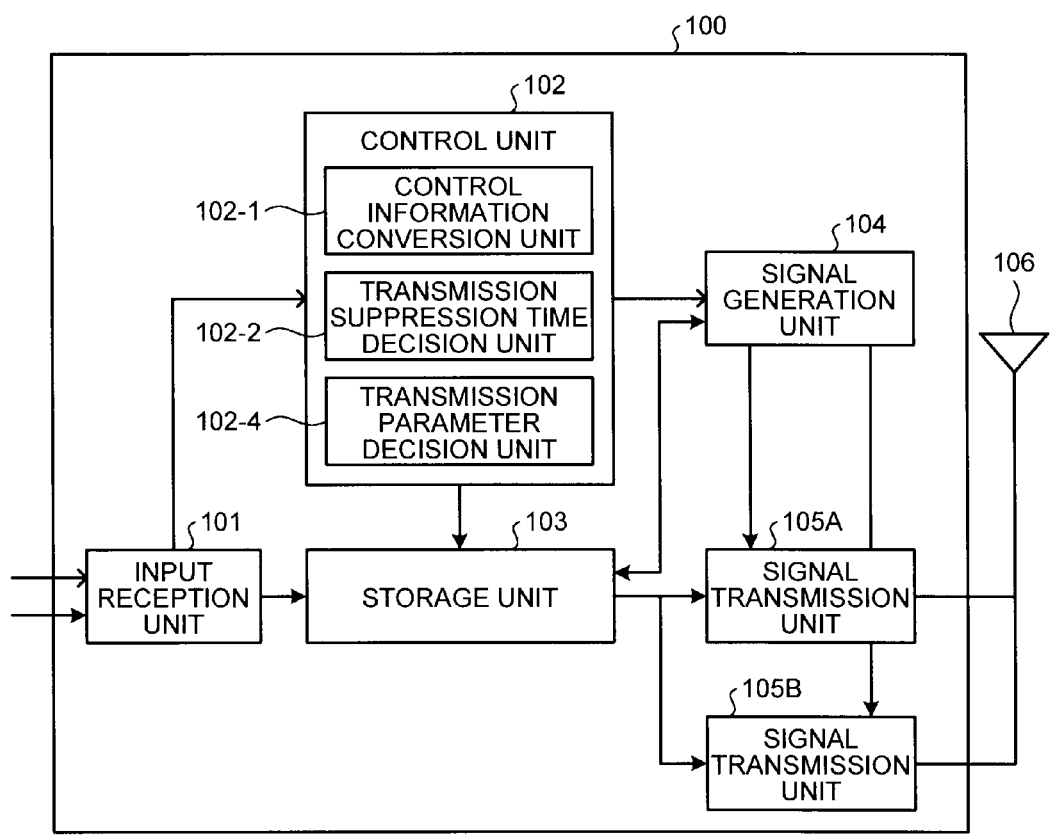
FIG. 26 is a diagram illustrating a functional configuration of a communication device according to a fifth embodiment.

In the third and fourth embodiments, the communication device 100 includes one signal transmission unit 105. In the present embodiment, the communication device 100 includes a plurality of signal transmission units 105A and 105B as illustrated in FIG. 26 so as to switch the signal transmission unit that is in charge of transmission of output signal according to switching of the transmission parameter described in the fourth embodiment. The signal transmission units 105A and 105B have the same configuration as the signal transmission unit 105.

When switching of the transmission parameter is implemented by one signal transmission unit 105, high-performance hardware is required, and the costs may possibly increase. For this reason, in the present embodiment, two versatile signal transmission units are mounted, and the signal transmission units 105A and 105B are switched when the transmission parameter is switched. Through this configuration, two communication methods can be implemented by different methods of combinations (for example, IEEE 802.11b, IEEE 802.15.4, etc.). As illustrated in FIG. 26, the antenna 106 may be shared by the two signal transmission units 105A and 105B. Alternatively, the communication device 100 may include antennas which correspond to the signal transmission units 105A and 105B, respectively. Further, three or more signal transmission units 105 may be installed in the communication device 100.

At the time of generating the output signal, the signal generation unit 104 sets the transmission suppression time to each of a first-half and a second-half divided by a switching pint in time when the transmission parameter is switched in the middle of the frame.

Figure 27:
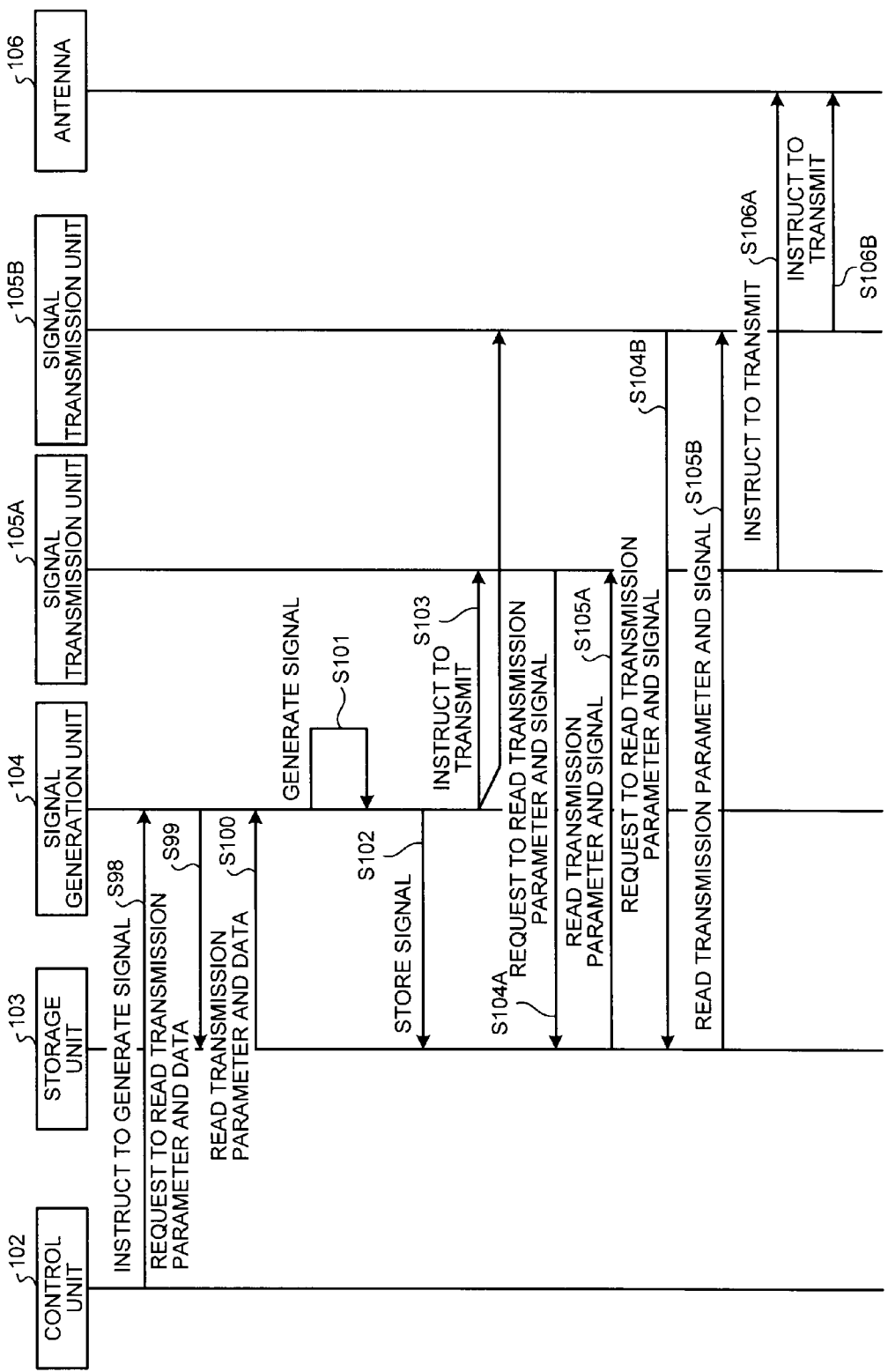
FIG. 27 is a flowchart illustrating a procedure of a communication process.

Next, a procedure of a communication process performed by the communication device 100 according to the present embodiment will be described with reference to FIG. 27. The procedure of the communication process according to the present embodiment is almost the same as the communication process according to the third embodiment described using FIG. 20. In FIG. 27, steps S91 to S97 and steps S2 to S9 of FIG. 4 subsequent thereto are not illustrated. Steps S98 to S102 illustrated in FIG. 27 are the same as in the third embodiment. In step S103, the signal generation unit 104 notifies each of the signal transmission units 105A and 105B of the storage address of the output signal according to switching of the transmission parameter and the storage address of the transmission parameter and instructs each of the signal transmission units 105A and 105B to transmit the output signal.

For example, when the communication device 100 transmits the radio wave of the wave form corresponding to the value "0" as illustrated in FIG. 23 (see an upper part of FIG. 28), the signal generation unit 104 notifies the signal transmission unit 105A of the storage address of the output signal in which the standby time $t_{0off}$ and the radio wave transmission time $T_0$ are designated and the storage address of the transmission parameter representing the transmission rate 1 and the transmission bit number 1 illustrated in the upper part of the row 1701 of FIG. 22 (the first part prior to the switching point) and instructs the signal transmission unit 105A to transmit the output signal as illustrated in FIG. 28(A). That is, after the standby time $t_{0off}$ has elapsed, transmission of the output signal such that the radio wave is output during the radio wave transmission time $T_0$ at the transmission rate 1 and the transmission bit number 1 is instructed. Further, the signal generation unit 104 notifies the signal transmission unit 105B of the storage address of the output signal in which the standby time "$t_{0off}+T_0$" and the radio wave transmission time "$t_{0on}-T_0$" are designated and the storage address of the transmission parameter representing the transmission rate 2 and the transmission bit number 2 illustrated in the lower part of the row 1701 of FIG. 22 (the second part subsequent to the switching point) and instructs the signal transmission unit 105B to transmit the output signal as illustrated in FIG. 28(B). That is, after the standby time "$t_{0off}+T_0$" has elapsed, transmission of the output signal, which is configured to provide the radio wave for the radio wave transmission time "$t_{0on}-T_0$" at the transmission rate 2 and the transmission bit number 2, is instructed.

Returning to the description of FIG. 27, when receiving the notification of the storage address of the output signal from the signal generation unit 104 and the storage address of the transmission parameter and the transmission instruction of the output signal, in steps S104A and S105A, the signal transmission unit 105A reads out the transmission parameter from the storage unit 103 and sequentially reads out the output signal from the storage unit 103. Then, in step S106A, the signal transmission unit 105A executes processing for transmitting the output signal as the radio wave and then transmits the radio wave according to the output signal to the communication partner through the antenna 106 at timing for transmitting the radio wave in the pulse converted in step S5 of FIG. 4 according to the first communication method so that the radio wave can be transmitted at the transmission rate and the transmission bit number represented by the transmission parameter on each frame in the output signal. In steps S104B to S106B, processing performed by the signal transmission unit 105B is the same as steps S104A to S106A, and thus a redundant description thereof will not be repeated.

A transmission instruction of the output signal illustrated in FIG. 28 is based on the assumption that the two signal transmission units 105A and 105B can share a point in time for starting transmission of each frame in the output signal. When such sharing is difficult, a method of designating only the radio wave transmission time from the signal generation unit 104 according to transmission timing without designating the standby time may be employed. Specifically, in the example of the transmission parameter illustrated in the row 1701 of FIG. 22, as illustrated in FIG. 29, the signal generation unit 104 may instruct the signal transmission unit 105A to transmit the output signal and then cause it to be on standby during the time $T_0$ in step S103A in the first part prior to the switching point and may instruct the signal transmission unit 105B to transmit the output signal in step S103B in the second part subsequent to the switching point. As a result, in step S106A, the radio wave according to the first part prior to the switching point of the transmission parameter in the frame is transmitted from the signal transmission unit 105A. After the time $T_0$ elapses, in step S106B, the radio wave according to the second part subsequent to the switching point of the transmission parameter in the frame is transmitted from the signal transmission unit 105B. Further, in order to prevent the generation of a section in which the radio wave is not output, which is caused by mismatch of timing between the signal transmission units 105A and 105B, the two radio waves may overlap by intentionally advancing transmission timing of the radio wave of the second part. In this case, the signal generation unit 104 adjusts the radio wave transmission time so that the radio wave transmission time is extended by the advanced time.

As described above, in the present embodiment, the communication device 100 includes a plurality of signal transmission units, and thus a degree of freedom of the transmission parameter can be increased.

As described above, according to the first embodiment to the fifth embodiment, without expending a memory in large quantity and complicating a configuration, the radio wave transmitted by the first communication method can be more reliably transmitted, and communication with the communication device other than the communication partner that performs communication by the second communication method can be reliably suppressed.

In the above-described embodiments, various program executed by the communication device 100 may be configured to be stored in a computer connected to a network such as the Internet and provided by downloading through the network. The various programs may be files having an installable format or an executable format and may be provided as a computer program product recorded on a computer readable recording medium such as a compact disc read only memory (CD-ROM), a flexible disk (FD), a compact disc rewritable (CD-R), and a digital versatile disc (DVD).

In the third to fifth embodiments, the control unit 102 of the communication device 100 includes the transmission suppression time decision unit 102-2, but the transmission suppression time decision unit 102-2 may not be included. That is, the communication device 100 may not have a function for deciding the transmission suppression time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirits of the inventions.

What is claimed is:

1. A communication device that performs communication using a first communication method that transmits a pulse-like radio wave and a second communication method that suppresses communication with a communication device other than a communication partner by transmitting a transmission suppression signal, comprising:
   a conversion unit that converts, according to the first communication method, information to be transmitted into information for forming a pulse that is formed depending on the presence and absence of transmission of a radio wave;
   a first decision unit that decides a suppression time, during which communication with a communication device other than the communication partner is suppressed, on the basis of a result of conversion of the conversion unit;
   a generation unit that generates an output signal including the transmission suppression signal, in which the suppression time is set for each first element in the pulse, according to the second communication method, the first element transmitting a radio wave; and
   a transmission unit that transmits a radio wave according to the output signal to the communication partner at timing to transmit a radio wave in the pulse.

2. The communication device according to claim 1, wherein the first decision unit decides a longest time, for which transmission of a radio wave is continuously suspended, as the suppression time, on the basis of a second element not transmitting a radio wave in the pulse as a result of conversion of the conversion unit.

3. The communication device according to claim 1, further comprising:
   a carrier sensing unit that monitors the presence and absence of a radio wave in a channel capable of transmitting a radio wave according to the second communication method; and
   a second decision unit that decides a channel through which the transmission unit transmits the radio wave according to the output signal on the basis of a result of monitoring performed by the carrier sensing unit,
   wherein the transmission unit transmits the radio wave according to the output signal to the communication partner at the timing through the decided channel.

4. The communication device according to claim 1, further comprising a third decision unit that decides a parameter representing a time, for which transmission of a radio wave of the first element is continued, in transmission of the radio wave according to the output signal,
   wherein the generation unit generates the output signal on the basis of the decided parameter, and
   the transmission unit transmits the radio wave according to the output signal to the communication partner at the timing according to the decided parameter.

5. The communication device according to claim 4, wherein the third decision unit decides the parameter for each first element, and
   the transmission unit transmits the radio wave according to the output signal to the communication partner at the timing according to the parameter of each first element.

6. The communication device according to claim 5, wherein the third decision unit decides a first parameter on a first part prior to a point in time within a period of time, in which a radio wave of the first element is being transmitted, and decides a second parameter on a second part subsequent to the point in time, and
   the transmission unit transmits the radio wave according to the output signal to the communication partner according to the first parameter in the first part prior to the point in time and transmits the radio wave according to the output signal to the communication partner according to the second parameter in the second part subsequent to the point in time.

7. The communication device according to claim 6, wherein the transmission unit comprises a plurality of the transmission units, the generation unit instructs a first transmission unit to transmit the radio wave according to the output signal according to the first parameter, corresponding to the first part prior to the point in time, and instructs a second transmission unit to transmit the radio wave according to the output signal according to the second parameter, corresponding to the second part subsequent to the point in time, the first transmission unit transmits the radio wave according to the output signal according to the first parameter in the first part prior to the point in time in response to an instruction of the generation unit, and the second transmission unit transmits the radio wave according to the output signal according the second parameter in the second part subsequent to the point in time in response to an instruction of the generation unit.

8. The communication device according to claim 1, further comprising an determination unit that determines whether the information represents that a radio wave is to be transmitted according to the first communication method or that a radio wave is to be transmitted according to the second communication method, wherein when the information is determined to represent that a radio wave is to be transmitted according to the first communication method, the first decision unit decides the suppression time on the basis of the result of conversion of the conversion unit, and the generation unit generates the output signal according to the first communication method.

9. A program product having a computer readable medium including programmed instructions, wherein the instructions, when executed by a computer used by a communication device that performs communication using a first communication method that transmits a pulse-like radio wave and a second communication method that suppresses communication with a communication device other than a communication partner by transmitting a transmission suppression signal, cause the computer to perform:

converting, according to the first communication method, information to be transmitted to the communication partner into a pulse that is formed depending on the presence and absence of transmission of a radio wave;

deciding a suppression time, during which communication with a communication device other than the communication partner is suppressed, on the basis of a result of the converting;

generating an output signal including the transmission suppression signal, in which the suppression time is set for each first element in the pulse, according to the second communication method, the first element transmitting a radio wave; and transmitting a radio wave according to the output signal to the communication partner at timing to transmit a radio wave in the pulse.

* * * * *